(12) United States Patent
Jenson et al.

(10) Patent No.: US 7,274,118 B2
(45) Date of Patent: *Sep. 25, 2007

(54) SOLID STATE MEMS ACTIVITY-ACTIVATED BATTERY DEVICE AND METHOD

(75) Inventors: Mark L. Jenson, Zimmerman, MN (US); Jody J. Klaassen, Minneapolis, MN (US); Jim Sullivan, Webster, NY (US); Charles A. Lemaire, Apple Valley, MN (US); Richard E. Billion, Apple Valley, MN (US)

(73) Assignee: Cymbet Corporation, Elk River, MN (US)

( * ) Notice: Subject to any disclaimer, the term of this patent is extended or adjusted under 35 U.S.C. 154(b) by 130 days.

This patent is subject to a terminal disclaimer.

(21) Appl. No.: 11/134,017

(22) Filed: May 20, 2005

(65) Prior Publication Data

US 2005/0218726 A1 Oct. 6, 2005

Related U.S. Application Data

(62) Division of application No. 10/336,620, filed on Jan. 2, 2003, now Pat. No. 6,906,436.

(51) Int. Cl.
*H01H 35/00* (2006.01)
(52) U.S. Cl. .................................................. 307/116
(58) Field of Classification Search ................ 307/116
See application file for complete search history.

(56) References Cited

U.S. PATENT DOCUMENTS

| | | | |
|---|---|---|---|
| 3,419,487 A | 12/1968 | Robbins et al. | |
| 4,207,119 A | 6/1980 | Tyan | |
| 4,299,890 A | 11/1981 | Rea et al. | |
| 4,328,262 A | 5/1982 | Kurahashi et al. | |
| 4,333,808 A | 6/1982 | Bhattacharyya et al. | |
| 4,353,160 A | 10/1982 | Armini et al. | |
| 4,365,107 A | 12/1982 | Yamauchi | |
| 4,435,445 A | 3/1984 | Allred et al. | |
| 4,440,108 A | 4/1984 | Little et al. | |
| 4,481,265 A | 11/1984 | Ezawa et al. | |
| 4,520,039 A | 5/1985 | Ovshinsky | |
| 4,633,129 A | 12/1986 | Cuomo et al. | |

(Continued)

FOREIGN PATENT DOCUMENTS

DE 19948742 12/2000

(Continued)

OTHER PUBLICATIONS

Aramoto, T. , et al., "16.0% Efficient Thin-Film CdS/CdTe Solar Cells", *Jpn. J. Appl. Phys.*, vol. 36, Pt. 1, No. 10, (1997),6304-6305.

(Continued)

*Primary Examiner*—Robert L. Deberadinis
(74) *Attorney, Agent, or Firm*—Charles A. Lemaire; Lemaire Patent Law Firm, P.L.L.C.

(57) ABSTRACT

A system includes a thin-film battery and an activity-activated switch. In some embodiments, the system is placed on a substrate with an adhesive backing. In some embodiments, the substrate is flexible. Also formed on the substrate is an electrical circuit that includes electronics. The activity-activated switch places the thin-film battery in electrical communication with the circuit and electronics. The battery and the circuit are formed on the substrate and may be comprised of one or a plurality of deposited layers.

24 Claims, 17 Drawing Sheets

U.S. PATENT DOCUMENTS

| | | |
|---|---|---|
| 4,645,726 A | 2/1987 | Hiratani et al. |
| 4,684,848 A | 8/1987 | Kaufman et al. |
| 4,696,671 A | 9/1987 | Epstein et al. |
| 4,730,383 A | 3/1988 | Balkanski |
| 4,740,431 A | 4/1988 | Little |
| 4,798,574 A | 1/1989 | Marsik |
| 4,832,463 A | 5/1989 | Goldner et al. |
| 4,862,032 A | 8/1989 | Kaufman et al. |
| 5,017,550 A | 5/1991 | Shioya et al. |
| 5,022,930 A | 6/1991 | Ackerman et al. |
| 5,051,274 A | 9/1991 | Goldner et al. |
| 5,064,520 A | 11/1991 | Miyake et al. |
| 5,089,104 A | 2/1992 | Kanda et al. |
| 5,098,737 A | 3/1992 | Collins et al. |
| 5,115,378 A | 5/1992 | Tsuchiya et al. |
| 5,126,031 A | 6/1992 | Gordon et al. |
| 5,151,848 A | 9/1992 | Finello |
| 5,166,009 A | 11/1992 | Abraham et al. |
| 5,171,413 A | 12/1992 | Arntz et al. |
| 5,180,645 A | 1/1993 | More |
| 5,189,550 A | 2/1993 | Goldner et al. |
| 5,192,947 A | 3/1993 | Neustein |
| 5,202,196 A | 4/1993 | Wang et al. |
| 5,202,201 A | 4/1993 | Meunier et al. |
| 5,261,968 A | 11/1993 | Jordan |
| 5,273,837 A | 12/1993 | Aitken et al. |
| 5,296,122 A | 3/1994 | Katsube et al. |
| 5,314,765 A | 5/1994 | Bates |
| 5,338,625 A | 8/1994 | Bates et al. |
| 5,348,703 A | 9/1994 | Bishop et al. |
| 5,393,572 A | 2/1995 | Dearnaley |
| 5,411,592 A | 5/1995 | Ovshinsky et al. |
| 5,415,717 A | 5/1995 | Perneborn |
| 5,425,966 A | 6/1995 | Winter et al. |
| 5,426,561 A | 6/1995 | Yen et al. |
| 5,433,096 A | 7/1995 | Janssen et al. |
| 5,445,126 A | 8/1995 | Graves, Jr. |
| 5,445,906 A | 8/1995 | Hobson et al. |
| 5,448,110 A | 9/1995 | Tuttle et al. |
| 5,449,994 A | 9/1995 | Armand et al. |
| 5,455,126 A | 10/1995 | Bates et al. |
| 5,468,521 A | 11/1995 | Kanai et al. |
| 5,482,611 A | 1/1996 | Helmer et al. |
| 5,494,762 A | 2/1996 | Isoyama et al. |
| 5,501,175 A | 3/1996 | Tanaka et al. |
| 5,501,924 A | 3/1996 | Swierbut et al. |
| 5,510,209 A | 4/1996 | Abraham et al. |
| 5,512,147 A | 4/1996 | Bates et al. |
| 5,523,179 A | 6/1996 | Chu |
| 5,528,222 A | 6/1996 | Moskowitz et al. |
| 5,529,671 A | 6/1996 | Debley et al. |
| 5,536,333 A | 7/1996 | Foote et al. |
| 5,549,989 A | 8/1996 | Anani |
| 5,558,953 A | 9/1996 | Matsui et al. |
| 5,561,004 A | 10/1996 | Bates et al. |
| 5,567,210 A | 10/1996 | Bates et al. |
| 5,569,520 A | 10/1996 | Bates |
| 5,569,564 A | 10/1996 | Swierbut et al. |
| 5,571,749 A | 11/1996 | Matsuda et al. |
| 5,582,623 A | 12/1996 | Chu |
| 5,585,999 A | 12/1996 | De Long et al. |
| 5,593,551 A | 1/1997 | Lai |
| 5,597,660 A | 1/1997 | Bates et al. |
| 5,599,644 A | 2/1997 | Swierbut et al. |
| 5,601,652 A | 2/1997 | Mullin et al. |
| 5,612,152 A | 3/1997 | Bates |
| 5,626,976 A | 5/1997 | Blanton et al. |
| 5,644,207 A | 7/1997 | Lew et al. |
| 5,654,084 A | 8/1997 | Egert |
| 5,654,111 A | 8/1997 | Minomiya et al. |
| 5,686,201 A | 11/1997 | Chu |
| 5,695,873 A | 12/1997 | Kumar et al. |
| 5,695,885 A | 12/1997 | Malhi |
| 5,705,293 A | 1/1998 | Hobson |
| 5,714,404 A | 2/1998 | Mitlitsky et al. |
| 5,763,058 A | 6/1998 | Isen et al. |
| 5,789,108 A | 8/1998 | Chu |
| 5,814,420 A | 9/1998 | Chu |
| 5,830,331 A | 11/1998 | Kim et al. |
| 5,849,426 A | 12/1998 | Thomas et al. |
| 5,863,337 A | 1/1999 | Neuman et al. |
| 5,868,914 A | 2/1999 | Landsbergen et al. |
| 5,872,080 A | 2/1999 | Arendt et al. |
| 5,914,507 A | 6/1999 | Polla et al. |
| 5,925,483 A | 7/1999 | Kejha et al. |
| 5,932,284 A | 8/1999 | Reynolds |
| 5,935,727 A | 8/1999 | Chiao |
| 5,953,677 A | 9/1999 | Sato |
| 5,978,207 A | 11/1999 | Anderson et al. |
| 5,981,107 A | 11/1999 | Hamano et al. |
| 5,982,284 A | 11/1999 | Baldwin et al. |
| 5,995,006 A | 11/1999 | Walsh |
| 6,001,715 A | 12/1999 | Manka et al. |
| 6,002,208 A | 12/1999 | Maishev et al. |
| 6,023,610 A | 2/2000 | Wood, Jr. |
| 6,025,094 A | 2/2000 | Visco et al. |
| 6,033,471 A | 3/2000 | Nakanishi et al. |
| 6,037,717 A | 3/2000 | Maishev et al. |
| 6,042,687 A | 3/2000 | Singh et al. |
| 6,056,857 A | 5/2000 | Hunt et al. |
| 6,059,847 A | 5/2000 | Farahmandi et al. |
| 6,077,621 A | 6/2000 | Allen et al. |
| 6,078,791 A | 6/2000 | Tuttle et al. |
| 6,086,962 A | 7/2000 | Mahoney et al. |
| 6,094,292 A | 7/2000 | Goldner et al. |
| 6,103,412 A | 8/2000 | Hirano et al. |
| 6,110,620 A | 8/2000 | Singh et al. |
| 6,130,507 A | 10/2000 | Maishev et al. |
| 6,133,159 A | 10/2000 | Vaartstra et al. |
| 6,136,165 A | 10/2000 | Moslehi |
| 6,139,964 A | 10/2000 | Sathrum et al. |
| 6,147,354 A | 11/2000 | Maishev et al. |
| 6,153,067 A | 11/2000 | Maishev et al. |
| 6,163,260 A | 12/2000 | Conwell et al. |
| 6,168,884 B1 | 1/2001 | Neudecker et al. |
| 6,175,196 B1 * | 1/2001 | Ragner et al. .......... 315/200 A |
| 6,181,237 B1 | 1/2001 | Gehlot |
| 6,181,545 B1 | 1/2001 | Amatucci et al. |
| 6,203,944 B1 | 3/2001 | Turner et al. |
| 6,220,516 B1 | 4/2001 | Tuttle et al. |
| 6,222,117 B1 | 4/2001 | Shiozaki |
| 6,236,061 B1 | 5/2001 | Walpita |
| 6,238,813 B1 | 5/2001 | Maile et al. |
| 6,264,709 B1 | 7/2001 | Yoon et al. |
| 6,277,523 B1 | 8/2001 | Giron |
| 6,280,875 B1 | 8/2001 | Kwak et al. |
| 6,281,795 B1 | 8/2001 | Smith et al. |
| 6,294,722 B1 | 9/2001 | Kondo et al. |
| 6,325,294 B2 | 12/2001 | Tuttle et al. |
| 6,327,909 B1 | 12/2001 | Hung et al. |
| 6,391,664 B1 | 5/2002 | Goruganthu et al. |
| 6,399,489 B1 | 6/2002 | M'Saad et al. |
| 6,402,795 B1 | 6/2002 | Chu et al. |
| 6,402,796 B1 | 6/2002 | Johnson |
| 6,413,675 B1 | 7/2002 | Harada et al. |
| 6,432,577 B1 | 8/2002 | Shul et al. |
| 6,475,854 B2 | 11/2002 | Narwankar et al. |
| 6,558,836 B1 * | 5/2003 | Whitacre et al. .......... 429/162 |
| 6,576,365 B1 | 6/2003 | Meitav et al. |
| 6,576,369 B1 | 6/2003 | Moriguchi et al. |
| 6,599,580 B2 | 7/2003 | Muffoletto et al. |
| 6,608,464 B1 | 8/2003 | Lew et al. |
| 6,610,971 B1 | 8/2003 | Crabtree |
| 6,626,040 B1 * | 9/2003 | Pereira et al. .......... 73/514.38 |

| | | | |
|---|---|---|---|
| 6,634,232 B1 | 10/2003 | Rettig et al. | |
| 6,645,656 B1 | 11/2003 | Chen et al. | |
| 6,723,140 B2 | 4/2004 | Chu et al. | |
| 6,741,178 B1 | 5/2004 | Tuttle | |
| 6,805,998 B2 | 10/2004 | Jenson et al. | |
| 6,818,356 B1 | 11/2004 | Bates | |
| 6,821,348 B2 | 11/2004 | Baude et al. | |
| 6,866,901 B2 | 3/2005 | Burrows et al. | |
| 6,897,164 B2 | 5/2005 | Baude et al. | |
| 6,906,436 B2 * | 6/2005 | Jenson et al. | 307/116 |
| 6,924,164 B2 | 8/2005 | Jenson | |
| 6,982,132 B1 | 1/2006 | Goldner et al. | |
| 6,986,965 B2 | 1/2006 | Jenson et al. | |
| 6,989,750 B2 | 1/2006 | Shanks et al. | |
| 7,028,547 B2 * | 4/2006 | Shiratori et al. | 73/495 |
| 7,118,825 B2 * | 10/2006 | Rastegar et al. | 429/121 |
| 2001/0014398 A1 | 8/2001 | Veerasamy | |
| 2001/0033952 A1 | 10/2001 | Jenson et al. | |
| 2001/0043569 A1 | 11/2001 | Wood, Jr. | |
| 2001/0051300 A1 | 12/2001 | Moriguchi et al. | |
| 2002/0000034 A1 | 1/2002 | Jenson | |
| 2002/0037756 A1 | 3/2002 | Jacobs et al. | |
| 2002/0076616 A1 | 6/2002 | Lee et al. | |
| 2002/0110733 A1 | 8/2002 | Johnson | |
| 2002/0184949 A1 * | 12/2002 | Gianchandani et al. | 73/514.29 |
| 2003/0104590 A1 | 6/2003 | Santini, Jr. et al. | |
| 2003/0151118 A1 | 8/2003 | Baude et al. | |
| 2003/0171984 A1 | 9/2003 | Wodka et al. | |
| 2004/0077383 A1 | 4/2004 | Lappetelainen et al. | |
| 2004/0094949 A1 | 5/2004 | Savagian et al. | |
| 2005/0019666 A1 | 1/2005 | Yasuda | |
| 2005/0079418 A1 | 4/2005 | Kelley et al. | |

FOREIGN PATENT DOCUMENTS

| | | |
|---|---|---|
| EP | 0078404 | 5/1983 |
| EP | 0410627 | 1/1991 |
| EP | 0643544 | 3/1995 |
| EP | 0860888 | 8/1998 |
| EP | 0867752 | 9/1998 |
| EP | 1 041 657 A2 | 10/2000 |
| GB | 2 318 127 A | 4/1998 |
| GB | 2318127 | 4/1998 |
| JP | 58126679 | 7/1983 |
| JP | 57230095 | 7/1984 |
| JP | 59123236 | 7/1984 |
| JP | 60012679 | 1/1985 |
| JP | 60182961 | 2/1987 |
| JP | 62044960 | 2/1987 |
| JP | 63166151 | 1/1990 |
| JP | 03205757 | 9/1991 |
| JP | 03262697 | 11/1991 |
| JP | 06067018 | 3/1994 |
| JP | 6111828 | 4/1994 |
| JP | 6196178 | 7/1994 |
| JP | 06223805 | 8/1994 |
| JP | 07006933 | 1/1995 |
| JP | 07-050229 | 2/1995 |
| JP | 07057739 | 3/1995 |
| JP | 08017179 | 1/1996 |
| JP | 08293310 | 5/1996 |
| JP | 08-236105 | 9/1996 |
| JP | 08236105 | 9/1996 |
| JP | 08287901 | 11/1996 |
| JP | 08329983 | 12/1996 |
| JP | 09035233 | 2/1997 |
| JP | 09211204 | 8/1997 |
| JP | 10021896 | 1/1998 |
| JP | 10021933 | 1/1998 |
| JP | 2000188113 | 7/2000 |
| WO | WO-99/33124 | 7/1990 |
| WO | WO-92/15140 | 9/1992 |
| WO | WO-92/16025 | 9/1992 |
| WO | WO-92/19090 | 10/1992 |
| WO | WO-93/14612 | 7/1993 |
| WO | WO-95/14311 | 5/1995 |
| WO | WO-97/38453 | 10/1997 |
| WO | WO-97/39491 | 10/1997 |
| WO | WO-98/13743 | 4/1998 |
| WO | WO-98/47196 | 10/1998 |
| WO | WO-99/25908 | 5/1999 |
| WO | WO-01/29565 A1 | 4/2001 |

OTHER PUBLICATIONS

Birkmire, R. W., et al., "Polycrystalline Thin Film Solar Cells: Present Status and Future Potential", *Annu. Rev. Mater. Sci.*, 27, (1997),pp. 625-653.

Chu, T. L., et al., "13.4% efficient thin-film CdS/CdTe solar cells", *J. Appl. Phys.*, 70(12), (Dec. 15, 1991),pp. 7608-7612.

Dobley, Arthur, et al., "High Capacity Cathodes for Lithium-Air Batteries", Yardney Technical Products, Inc./Lithion, Inc. Pawcatuck, CT Electrochemical Society Conference,(May 20, 2004).

Dobley, Arthur, et al., "Non-aqueous Lithium-Air Batteries with an Advanced Cathode Structure", Yardley Technical Products, Inc. / Lithion, Inc. Pawcatuck, CT 41st Power Sources Conference Proceedings, Philadelphia, PA,(Dec. 10, 2003).

Dudney, N. J., et al., "Nanocrystalline $Li_xMn_{2-y}O_4$ Cathodes for Solid-State Thin-Film Rechargeable Lithium Batteries", *Journal of the Electrochemical Society*, 146(7), (1999),pp. 2455-2462.

Dunn, D., et al., "$MoS_2$ Deposited by ion beam assisted deposition: 2H or random layer structure.", *J. Mater. Res.* vol. 13, No. 10, (1998),pp. 3001-3007.

Goldner, R., et al., "Ambient Temperature Synthesis of Polycrystalline Thin Films of Lithium Cobalt Oxide with Controlled Crystallites Orientations", *Electrochemical Soc. Proceedings*, 98, (1999),268-273.

Goldner, R., et al., "Ambient Temperature Synthesis of Polycrystalline Thin Films of Lithium Cobalt Oxide with Controlled Crystallites' Orientation", *Mat. Res. Soc. Symp. Proc.*, 548, (1998),pp. 131-136.

Jacobson, A. J., "Intercalation Chemistry", In: *Encyclopedia of Inorganic Chemistry*, vol. 3, (1994),pp. 1556-1602.

Kyokane, J., et al., "Organic Solid Capacitor with Conducting Thin Films as Elecrolyte by Ion-Beam-Assisted Deposition", *Journal of Power Sources*, 60, (1996),pp. 151-155.

Liu, W., et al., "Deposition, Structural Characterization, and Broadband (1KHz-40GHz) Dielectri Behavior of $BaxTi_{2-x}O_y$ Thin Films", *Mat. Res. Soc. Symp. Proc.*, 310, (1993),pp. 157-162.

Lugsheider, E., et al., "Comparison of the Structure of PVD-Thin Films Deposited WIth Different Deposition Energies", *Surface and Coatings Technology*, 86-87 (1-3), (Dec. 1, 1996),177-183.

Martin, P. J., et al., "Modification of the Optical and Structural Properties of Dielectric $ZrO_2$ Films by Ion-assisted Deposition", *Journal of Applied Physics*, 55, (1984),235-241.

McKenzie, D. R., et al., "New Technology for PACVD", *Surface and Coatings Technology*, 82 (3), (1996),326-333.

Nomoto, S., et al., "Back-up Performance of Electric Double-Layer Capacitors for Rechargeable Batteries", *Electrochemical Society Proceedings*, (1997),857.

Shodai, T, et al., "Reaction Mechanisms of Li(2.6)Co(0.4) Anode Material", *Solid State Ionics*, (1999),85-93.

Shukla, A. K., et al., "Electrochemical supercapacitors: Energy storage beyond batteries", *Current Science*, vol. 79, No. 12, (Dec. 25, 2000), 1656-1661.

Vereda, F., et al., "A Study of Electronic Shorting in IBDA-deposited Lipon Films", *Journal of Power Sources*, 89, (2000),201-205.

Yoshida, T., "Photovoltaic Properties of Screen-Printed CdTe/CdS Solar Calls on Indium-Tin-Oxide Coated Glass Substrates", *J. Electrochem. Soc.*, 142, (9), (Sep. 1995),pp. 3232-3237.

Zeitler, M., et al., "In Situ Stress Analysis of Boron Nitride Films Prepared by Ion Beam Assisted Deposition", *Nuclear Instruments and Methods in Physics Research B*, 139, (1998),pp. 327-331.

Abraham, K. M., et al., "A Polymer Electrolyte-Based Rechargeable Lithium/Oxygen Battery", *Journal of the Electrochemical Society*, vol. 143, (1996),1-5.

Dudney, Nancy J., "Addition of a thin-film inorganic solid electrolyte (Lipon) as a protective film in lithium batteries with a liquid electrolyte", *Journal of Power Sources*, vol. 89, (2000),176-179.

Read, J, "Characterization of the Lithium/Oxygen Organic Electrolyte Battery", *Journal of the Electrochemical Society*, 149, (2002),A1190-A1195.

* cited by examiner

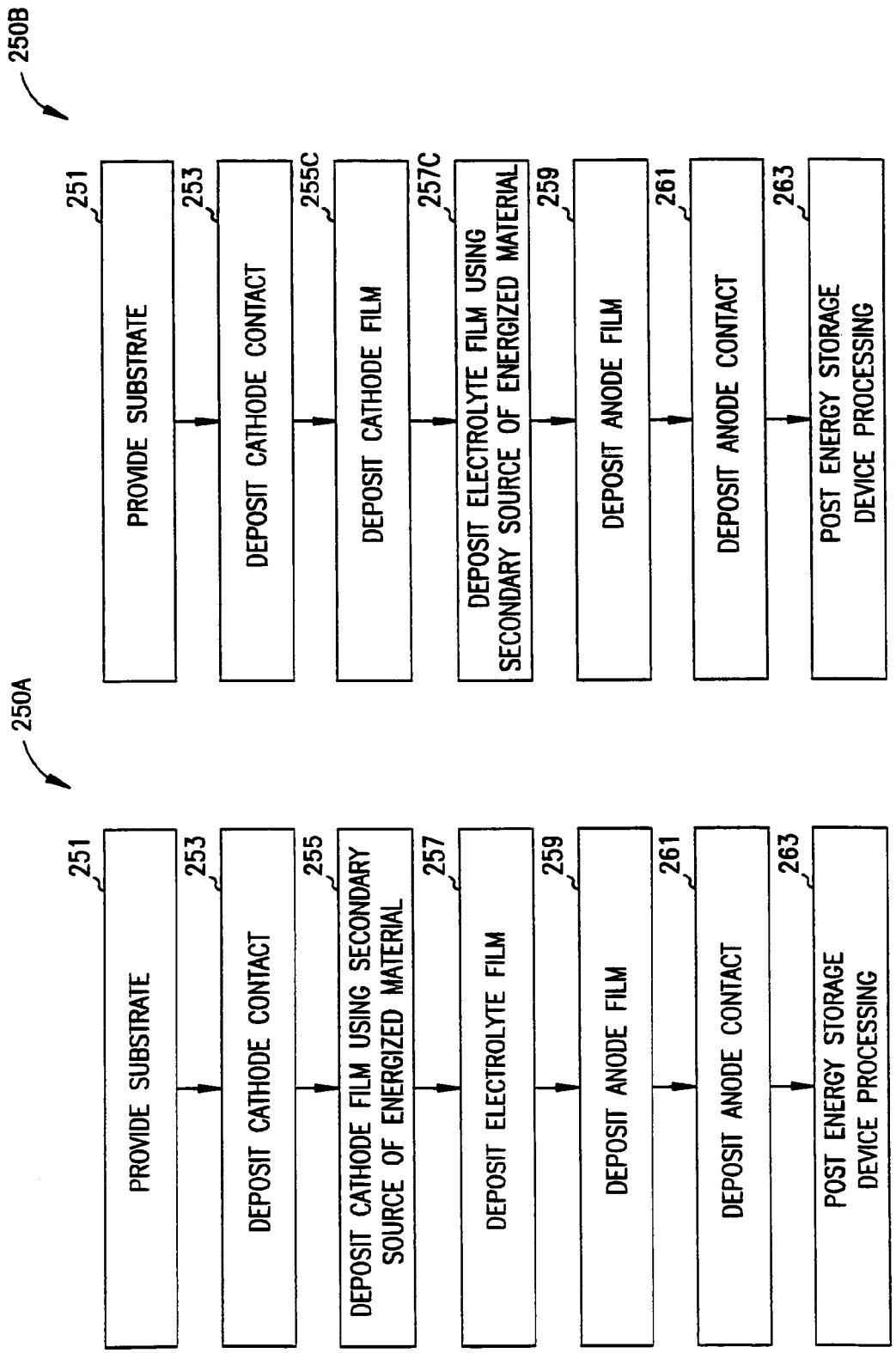

SOLID STATE MEMS ACTIVITY-ACTIVATED BATTERY DEVICE AND METHOD

CROSS-REFERENCE TO RELATED INVENTIONS

This is a divisional of prior U.S. patent application Ser. No. 10/336,620 entitled "SOLID STATE ACTIVITY-ACTIVATED BATTERY DEVICE AND METHOD," filed Jan. 2, 2003 now U.S. Pat. No. 6,906,436, which is incorporated in its entirety by reference.

This invention is related to the following U.S. patent application

Ser. No. 09/816,602 entitled "DEVICE ENCLOSURES WITH INTEGRATED BATTERY" filed Mar. 23, 2001;

Ser. No. 09/815,884 entitled "BATTERY-OPERATED WIRELESS-COMMUNICATION APPARATUS AND METHOD" filed Mar. 23, 2001;

Ser. No. 10/336,621 entitled "APPARATUS AND METHOD FOR DEPOSITING MATERIAL ONTO A SUBSTRATE USING A ROLL-TO-ROLL MASK" filed Jan. 2, 2003;

Ser. No. 10/336,619 entitled "APPARATUS AND METHOD FOR DEPOSITING MATERIAL ONTO MULTIPLE INDEPENDENTLY MOVING SUBSTRATES IN A CHAMBER" filed Jan. 2, 2003; and Ser. No. 10/336,662 entitled "ACTIVE WIRELESS TAGGING SYSTEM ON PEEL AND STICK SUBSTRATE" filed Jan. 2, 2003;

each of which is also incorporated in entirety by reference.

FIELD OF THE INVENTION

The present invention relates to solid-state energy-storage devices and integration of these devices with activity-actuated switches and circuits. More particularly, this invention relates to methods and systems for providing various apparatus with a solid-state energy-storage device that is activated at a later time to perform various functions. The present invention also relates to the use of thin-film solid-state energy-storage devices that include an adhesive.

BACKGROUND OF THE INVENTION

Electronics have been incorporated into many portable devices such as computers, mobile phones, tracking systems, scanners, etc. One drawback to portable devices is the need to include the power supply with the device. Portable devices typically use batteries as power supplies. Batteries must have sufficient capacity to power the device for at least the length of time the device is in use. Sufficient battery capacity can result in a power supply that is quite heavy or large compared to the rest of the device. In other words, current batteries generally are rather large and cannot be incorporated into small packages. There is a need for small batteries that can be formed for use in a small package.

Another drawback is that most batteries have to be manually switched on for use. In many applications, there is a need for a battery that can be switched on in response to an event or occurrence of some sort. In other words, there is a need for a battery that switches on automatically in response to an event.

Most batteries today are fairly expensive. As a result, economics prevent widespread use of batteries. In other words, currently, retailers would rarely consider providing a battery as part of the packaging associated with many items. Typically, batteries may be provided as part of the product shipped but not as part of the packaging. Thus, there is a further need for a battery that can be made inexpensively and mass-produced. There is still a further need for smaller and lighter batteries (i.e., power supplies) with sufficient energy storage to accomplish at least one function.

There is still a further need for batteries and methods of use that can be automatically performed as a result of an event at a time other than when a person can manually switch on a battery. There is also a need for a battery that can be fabricated from non-toxic materials.

BRIEF SUMMARY OF THE INVENTION

The present invention provides a thin-film battery and an activity-activated switch. A system includes a substrate, a circuit connected to the substrate, and a thin-film battery connected to the substrate and connected to the circuit. The thin-film battery powers the circuit. An acceleration-enabled switch is also connected to the substrate for electrically activating the circuit. In one embodiment, the acceleration-enabled switch is a MEMS device. In one embodiment, the acceleration-enabled switch includes at least one cantilevered beam. In another embodiment, the acceleration-enabled switch includes at least one cantilevered beam and an electrical contact. The at least one cantilevered beam contacts the electrical contact in response to an acceleration. In another embodiment, the acceleration-enabled switch includes a first cantilevered-beam-closure-switch, and a second cantilevered-beam-closure-switch. The first cantilevered-beam-closure-switch forms electrical contact in response to a first acceleration, and the second cantilevered-beam-closure-switch forms electrical contact in response to a second acceleration. The first acceleration is different than the second acceleration. In another embodiment, the acceleration-enabled switch forms a first electrical contact in response to a first acceleration, and forms a second electrical contact in response to a second acceleration. The first acceleration is different than the second acceleration. In still another embodiment, the first acceleration-enabled switch activates the circuit differently in response to acceleration in either of two different planes. A first cantilevered-beam-closure-switch forms electrical contact in response to a first acceleration in a first plane, and a second cantilevered-beam-closure-switch forms electrical contact in response to a first acceleration in response to a second acceleration in a second plane.

The circuit further includes a memory, and a timer. The timer records the time when one of the first cantilevered-beam-closure-switch forms electrical contact in response to a first acceleration, or the time when the second cantilevered-beam-closure-switch forms electrical contact in response to a second acceleration is stored in memory. In some embodiments, the time when the other of the first cantilevered-beam-closure-switch forms electrical contact in response to a first acceleration, or the time when the second cantilevered-beam-closure-switch forms electrical contact in response to a second acceleration is stored in memory.

In one embodiment, the battery is sputtered onto the substrate, and the circuit is formed on the battery. In another embodiment, the circuit is sputtered onto the substrate, and the battery is sputtered onto the circuit. In still another embodiment, the system fits within a device such as a package, or an ordinance. In yet another embodiment, an adhesive attached to the substrate wherein the system is adhesively attached to the device. The adhesive attached to the substrate.

A system includes a substrate, and a thin-film battery positioned on the substrate. The thin-film battery further includes a first lead, a first electrical contact in electrical communication with the first lead, a second lead, and a second electrical contact in electrical communication with the second lead. The system also includes an activity-activated switch connected to one of the first and second leads on the substrate for electrically connecting the thin-film battery to the first electrical contact and the second electrical contact. An adhesive is attached to the substrate. The activity-activated switch is activated in response to acceleration. In one embodiment, the activity-activated switch is activated in response to a magnetic field. In another embodiment, the activity-activated switch is activated in response to moisture. In still another embodiment, the activity-activated switch is activated in response to a radio signal. In yet another embodiment, the activity-activated switch is activated in response to pressure. In still another embodiment, the activity-activated switch is activated in response to light. The system also includes electronics attached to the first lead and the second lead. The electronics are also associated with the substrate. In some embodiments, the electronics are attached to the substrate and the thin-film battery is attached to the electronics. In another embodiment, the thin-film battery is attached to the substrate and at least a portion of the electronics is attached to the thin-film battery. The activity-activated switch is formed using microelectronic fabrication techniques.

A method includes activating an activity-activated switch to place a thin-film battery in communication with a set of electronics, and directing an ordinance using the powered electronics. Another method includes activating an activity-activated switch to place a thin-film battery in communication with a set of electronics and storing a start time for a warranty using the powered electronics. In one embodiment, the activity-activated switch includes accelerating the activity-activated switch at a selected level. In another embodiment, the method also includes running a self-check, and storing the result of the self-check in response to activating the activity-activated switch. In other embodiments, other accelerations are stored. The time associated with other accelerations over a selected threshold is also recorded. The times of the other accelerations to the time are compared to other periods, such as when a shipper was in possession of the activity-activated switch.

Advantageously, the systems that include one or more batteries, and devices to enable or activate the battery or batteries, and a circuit, can be formed on a film and placed into small packages or products. In addition, the batteries, activation device and a circuit can be formed on a flexible sheet having an adhesive thereon so that the package is essentially a label that can be placed on the outside of a package or with the product packaging or on the product or device. A complete system can also be incorporated into a product or device to control an aspect of the device or record information about the product or device. The enabling or activating apparatus enable a switch in response to an event or events at a later time. The systems do not have to be manually activated. Rather, the systems are automatically activated in response to an event.

The entire system is inexpensive. As a result, these systems can affordably be used on a widespread basis. As a result, manufacturers, wholesalers and event retailers could provide such a system either attached to a device or as part of the packaging associated with many devices or products. In addition, these systems are light and provide sufficient energy storage to accomplish at least one function. The system is fabricated from non-toxic materials so that a hazard is not being used with a product or device.

BRIEF DESCRIPTION OF THE DRAWINGS

FIG. 2A is a flowchart of one embodiment of a fabrication process according to the teachings of the present invention.

FIG. 2B is a flowchart of one embodiment of a fabrication process according to the teachings of the present invention.

In the drawings, like numerals describe substantially similar components throughout the several views. Signals and connections may be referred to by the same reference number, and the meaning will be clear from the context of the description.

DETAILED DESCRIPTION OF THE INVENTION

In the following detailed description of the preferred embodiments, reference is made to the accompanying drawings that form a part hereof, and in which are shown, by way of illustration, specific embodiments in which the invention may be practiced. It is to be understood that other embodiments may be utilized and structural changes may be made without departing from the scope of the present invention.

It is to be understood that in different embodiments of the invention, each battery in the Figures or the description can be implemented using one or more cells, and if a plurality of cells is implemented, the cells can be wired in parallel or in series. Thus, where a battery or more than one cell is shown or described, other embodiments use a single cell, and where a single cell is shown or described, other embodiments use a battery or more than one cell. Further, the references to relative terms such as top, bottom, upper, lower, etc. refer to an example orientation such as used in the Figures, and not necessarily an orientation used during fabrication or use.

The terms wafer and substrate as used herein include any structure having an exposed surface onto which a film or layer is deposited, for example, to form an integrated circuit (IC) structure or an energy-storage device. The term substrate is understood to include semiconductor wafers, plastic film, metal foil, and other structures on which an energy-storage device may be fabricated according to the teachings of the present disclosure. The term substrate is also used to refer to structures during processing that include other layers that have been fabricated thereupon. Both wafer and substrate include doped and undoped semiconductors, epitaxial semiconductor layers supported by a base semiconductor or insulator, as well as other semiconductor structures well known to one skilled in the art. Substrate is also used herein as describing any starting material that is useable with the fabrication method as described herein.

The term battery used herein refers to one example of an energy-storage device. A battery may be formed of a single cell or a plurality of cells connected in series or in parallel. A cell is a galvanic unit that converts chemical energy, e.g., ionic energy, to electrical energy. The cell typically includes two electrodes of dissimilar material isolated from each other by an electrolyte through which ions can move.

The term adatom as used herein refers to a particle, molecule, or ion of material that has not yet been formed into a structure or film.

The term intercalation as used herein refers to a property of a material that allows ions to readily move in and out of the material without the material changing its phase. Accordingly, a solid-state intercalation film remains in a solid state during discharging and charging of an energy-storage device.

Figure 1A:
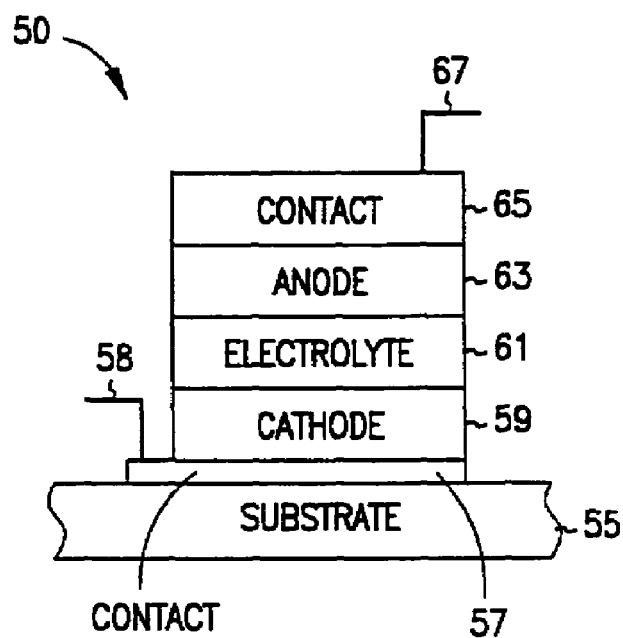
FIG. 1A is a cross-sectional view of an energy-storage device according to the present invention.

FIG. 1A shows an embodiment of an energy-storage device 50 according to the present invention. A substrate 55 is provided, on which is formed a contact film 57. Contact film 57 acts as a current collector and is connected to a lead 58, which, in some embodiments, connects one pole of the energy storage device 50 to an external circuit. In some embodiments, the electronic circuit is attached to the battery as formed. In other embodiments, the circuit may be remote from the battery, for example, not attached to the battery as formed. An electrode film 59 is formed on the contact film 57. In some embodiments, the electrode film 59 substantially covers a surface of the contact film 57 so as to minimize resistance by maximizing the area of the interface between the films. In some embodiments, the electrode film 59 is a cathode for a thin-film battery. In other embodiments, electrode film 59 is an electrode of a supercapacitor. An electrolyte film 61 is formed on the electrode film 59. An electrode film 63 is formed on the electrolyte film 61. The electrolyte film 61 isolates electrode film 59 from electrode film 63. A contact film 65 is formed on electrode film 63. Contact film 65 acts as a current collector and is connected to a lead 67, which connects one pole of the energy storage device 50 to an external circuit. In some embodiments, the contact film 65 substantially covers a surface of the electrode film 63 to as to minimize resistance by maximizing the area of the interface between these films. In some embodiments, the electrode film 63 is an anode for a thin-film battery. In other embodiments, electrode film 63 is an electrode of a supercapacitor.

Figure 1B:
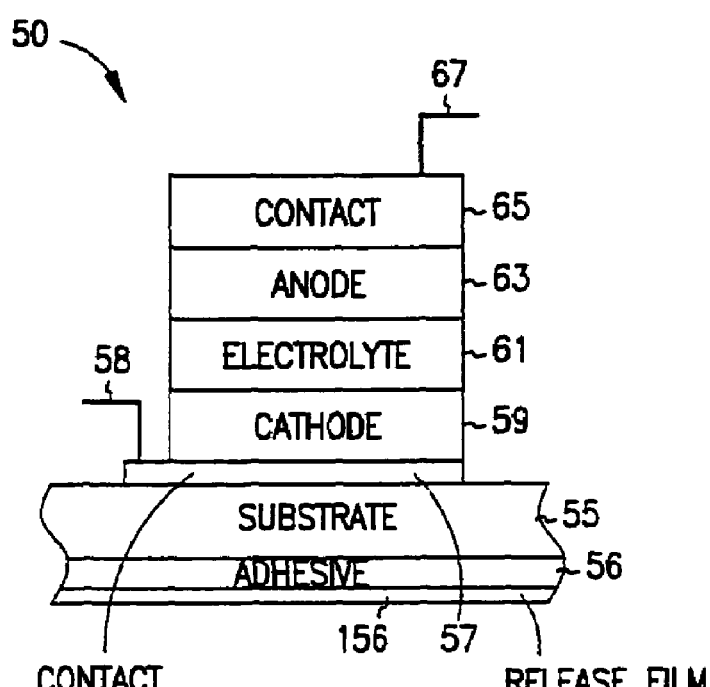
FIG. 1B is a cross-sectional view of another embodiment of an energy-storage device according to the present invention.

FIG. 1B shows another embodiment of the energy-storage device 50. This particular embodiment is closely related to the embodiment shown in FIG. 1A and therefore, for the sake of brevity, only the difference will be discussed. The main difference is that a layer of adhesive 56 is placed on the substrate 55. It should be noted that the adhesive 56 could be any type of adhesive including a releasable type of adhesive or a permanent adhesive. The adhesive layer 50, in some embodiments, is a peel-and-stick type of adhesive covered by a peelable paper or plastic-film layer 156. In some embodiments, the adhesive layer 56 covers the entire substrate 55 surface while, in other embodiments, the adhesive layer only covers a portion of the substrate surface 55. In other embodiments, the adhesive 56 is attached to the energy-storage device 50 (e.g., on top of contact 65) rather than directly to the substrate 55.

Figure 1C:
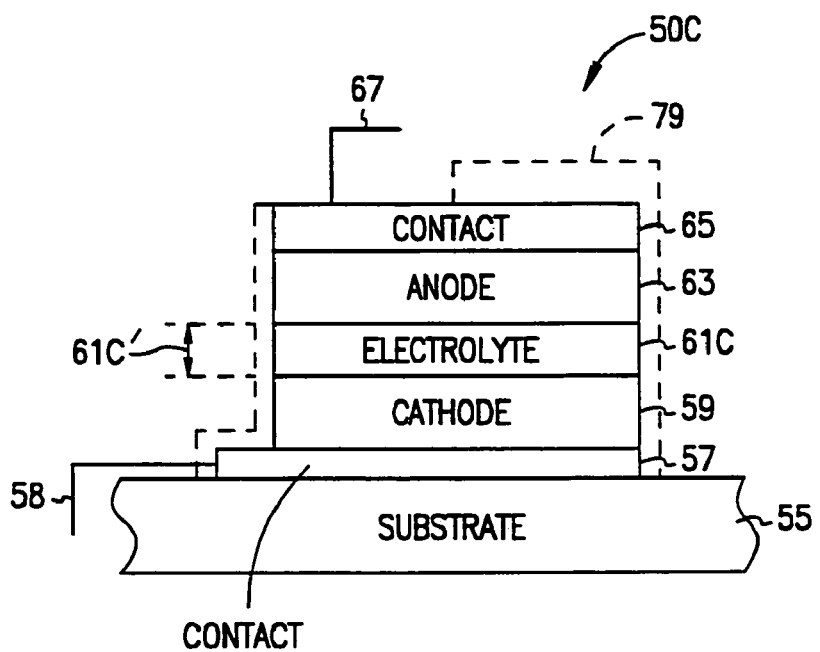
FIG. 1C is a cross-sectional view of an energy-storage device according to the present invention.

FIG. 1C shows a cross sectional view of an embodiment of an energy-storage device 50C. A substrate 55 is provided and, in some embodiments, includes additional layers and/or devices formed therewith. As will be discussed and shown below, such other devices include activity-actuated switches and circuits. In some embodiments, a battery or energy-storage device, or other device is formed on or atop the battery. In other embodiments, the battery is formed atop the circuit, or the circuit and activity-actuated switch. In some embodiments, the substrate 55 includes a substrate as described above and elsewhere herein. Contact film 57 and electrode 59 are formed on the substrate 55 according to the methods described herein. In some embodiments, contact film 57 and electrode 59 are metal films deposited on the substrate according to other methods as known in the art. Contact film 57 and electrode 59 act as contacts for connecting the energy-storage device 50C to other circuit elements (not shown).

An electrode first film 59 is formed on contact 57. Electrode first film 59 includes a metal or intercalation material in some embodiments, for example, thin-film battery embodiments in which the electrode first film 59 functions as a cathode. In some such embodiments, the electrode first film 59 includes lithium metal and/or a lithium-intercalation material. In other embodiments, such as supercapacitors, electrode first film 59 is a metal oxide. It is desirable to maximize the contact interface between the electrode first film 59 and contact film 57. Accordingly, in some embodiments, the electrode first film 59 substantially covers contact film 57 except for a portion reserved for connection to external circuits.

An electrolyte film 61C is formed on, or at least partially on, the electrode first film 59. The electrolyte film 61C, in some embodiments, completely encloses the electrode first film 59. The electrolyte film 61C is formed using the systems and methods described herein. In one embodiment, a first material of the electrolyte film 61C is deposited using a first source, which directs a first electrolyte material (adatoms) to the location on the substrate or, as shown in FIG. 1C, to a location on the electrode first film 59.

An electrode second film 63 is formed on electrolyte film 61C. Electrolyte film 61C completely separates the electrode first film 59 from the electrode second film 63. The electrode second film 63 includes a metal or intercalation material in some embodiments, for example, thin-film battery embodiments in which the electrode second film is an anode. In other embodiments, such as supercapacitor embodiments, electrode second film 63 is a metal oxide. Electrode second film 63, in some embodiments is deposited according to the methods described herein. In other embodiments, electrode second film 63 is formed according to methods known in the art.

The electrolyte film 61C, as deposited, includes the electrolyte material. A first source (e.g., sources 311, 511, 511A, and 711 as described herein) of the electrolyte material, in one embodiment, is a physical vapor deposition source. In another embodiment, the first source is a chemical vapor deposition source. A second source provides energized particles to the location. The energized particles impinge on the electrolyte material and assist in forming a desired structure of the electrolyte film 61C. In some embodiments, the second source provides energized particles simultaneously with the first source supplying the electrolyte material. The use of the energized particles conforms the electrolyte film 61C to electrode first film 59 such that the electrolyte film provides the necessary insulative property, namely preventing electrons from traveling directly between the electrode first film 59 and the electrode second film 63, i.e., shorting the electrodes, while also letting ions (e.g., lithium ions) travel between cathode 59 and anode 63 (the direction of travel depending on whether the device is charging or discharging). In some embodiments, the electrode 59 is designated "anode" and the electrode 63 is designated "cathode," thus switching which direction of ion movement is charging and which is discharging. In some embodiments, the second source is an ion source as described herein, e.g., sources 313, 413, or 713. The second source provides energized ions that supply energy to the electrolyte material from the first source. The energy that is supplied by the ions assists in conforming the formed electrolyte film 61C to the electrode first layer 59. It is believed that the use of the energized particles in the energy range referenced herein provides the growing electrolyte material an extended period of mobility upon the previous film surface, and this extended period of mobility allows the electrolyte material to grow in a more defect-free manner.

In some embodiments, it is desired to form the electrolyte film 61C as thin as possible ("ultra-thin") to lower its contribution to the internal resistance of the energy-storage device. It is also desired to maintain the electrolyte's property of blocking the flow of electrons (which would result in a short of the cathode to the anode) while permitting the flow of the ions that provide the battery function across the electrolyte. Using the methods and systems described herein, the electrolyte film 61C is formed to a thickness 61C' of less than about 5000 Angstroms. In some embodiments, the electrolyte film 61C has a thickness 61C' of less than about 2500 Angstroms. In some embodiments, the electrolyte film 61C has a thickness 61C' of less than about 1000 Angstroms. In some embodiments, the electrolyte film 61C has a thickness 61C' of less than about 500 Angstroms. In some embodiments, the electrolyte film 61C has a thickness 61C' of less than about 250 Angstroms. In some embodiments, the electrolyte film 61C has a thickness 61C' of less than about 100 Angstroms. In some embodiments, the electrolyte film 61C has a thickness 61C' in a range of about 10 Angstroms to about 200 Angstroms. In some embodiments, the electrolyte film 61C has a thickness 61C' in a range of about 10 Angstroms to about 100 Angstroms.

In one embodiment, the electrolyte film 61C includes LiPON and is formed using the first source 311 with the second source 313 or 413. As used herein, LiPON refers generally to lithium phosphorus oxynitride materials. One example is $Li_3PO_4N$. Other examples incorporate higher ratios of nitrogen in order to increase lithium ion mobility across the electrolyte. In some embodiments, the first source 311 provides $Li_3PO_4$ in a nitrogen atmosphere. In other embodiments, the first source 311 provides $Li_3PO_4$ in a vacuum environment wherein the background pressure is less than 1 E-3 Torr. The second source 313 or 413 provides energized particles from a source gas. In some embodiments, the secondary source is an ion source supplying energetic ions from a source gas comprising oxygen (e.g., $O_2$) or nitrogen (e.g., $N_2$). The source gas, in other embodiments, comprises a noble gas, e.g., argon, xenon, helium, neon, and krypton. The energized particles and/or ions increase the energy of the material forming the electrolyte film 61C, thus enhancing layer-by-layer growth. Accordingly, the electrolyte film is of a higher quality than conventional electrolyte layers.

An embodiment for forming a LiPON electrolyte film 61C includes the first source providing $Li_3PO_4$ at or to the location where the LiPON electrolyte film is to be formed and second source providing energized nitrogen particles to or near the same location. The energized nitrogen particles react with $Li_3PO_4$ provided at the location for forming the electrolyte film. This increases the amount of nitrogen in the LiPON electrolyte film. Increasing the nitrogen content is desirable to increase lithium ion mobility across the electrolyte.

In a further embodiment, the chamber in which the substrate 55 is positioned has a nitrogen-enhanced atmosphere. A LiPON electrolyte film 61C is formed by the $Li_3PO_4$ supplied by the first source reacting with the nitrogen in the chamber. The second source provides energized particles assisting in the formation of the electrolyte film. In another embodiment, the second source also provides nitrogen to the $Li_3PO_4$ at the location. Thus, the $Li_3PO_4$ reacts with both the nitrogen in the chamber and with energized, nitrogen containing particles supplied by the second source. This increases the nitrogen content of the electrolyte film 61C. In some embodiments, increasing the nitrogen content in the electrolyte film 61C is desirable since published data from the Department of Energy lab at Oak Ridge, Tenn. indicates an increase in nitrogen content increases the ion conductivity or mobility in the electrolyte film.

As will be understood by reading the present invention, the systems shown herein for depositing films are adaptable to form the electrolyte film 61C according to the present invention. Examples of some such systems are shown in FIGS. 3A-7.

Figure 1D:
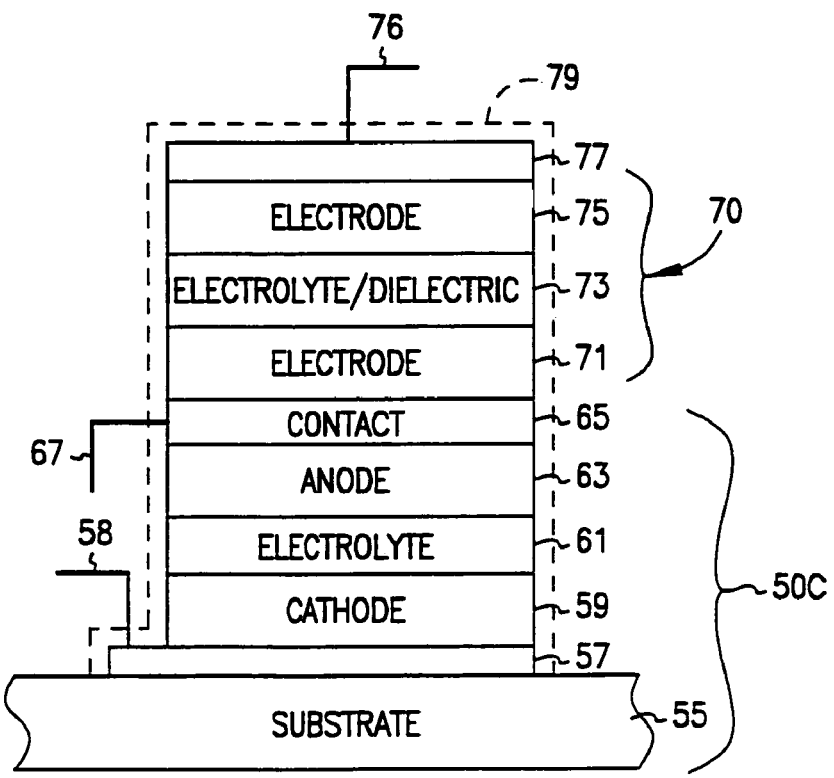
FIG. 1D is a cross-sectional view of an energy-storage device and a supercapacitor according to the present invention.

FIG. 1D shows another embodiment of an energy storage device according to the teachings of the present invention. A supercapacitor 70 is formed on the energy-storage device 50C having the ultra-thin electrolyte film 61. The energy-storage device 50C being formed on the substrate prior to forming the supercapacitor 70 represents an embodiment of layer/devices being formed on the substrate prior to applying the techniques described herein to form energy-storage and/or energy conversion devices. The supercapacitor 70 includes an intermediate film 73 formed in physical contact with electrode films 71 and 75. In some embodiments, the intermediate film 73 is an electrolyte for storing and discharging electrical charge by a faradaic process. In some embodiments, the intermediate film 73 includes a dielectric material. The contact film 65 is in physical and electrical contact with electrode 71. Thus, in this embodiment contact film 65 is a shared contact film for both the energy storage device 50C and supercapacitor 70. In other embodiments, energy storage device 50C and supercapacitor 70 have separate contact films. In some embodiments, the intermediate film 73 includes LiPON. In some embodiments, the electrolyte film 73 includes TaO. In some embodiments, the electrode films are $RuO_2$. A contact film 77 is formed on the electrode film 75. A lead 76 extends from the contact film 77 to contact one plate of the supercapacitor to an external circuit.

In some embodiments, contact film 65 is omitted, and a single electrode film serves for both an electrode 71 of device 70 and as an electrode 63 of device 50C.

A method 250A for fabricating the solid-state energy-storage device 50 will now be described with reference to FIGS. 1A and 2A. The method includes providing a substrate 55 (process operation 251) and depositing a cathode contact film 57 on the substrate 55 (process operation 253). In some embodiments, process operation 251 includes providing a substrate having insulator layers or other layers/devices formed thereon. The method further includes a process operation 255 of depositing an electrode material to a location on the substrate, while simultaneously supplying energized particles to the electrode material at the substrate. In one embodiment, an assist source provides the energized particles. In some such embodiments, the energized particle beam is directed to the same location on the substrate as the electrode material. In an embodiment, the energized particles are energized ions. The energized ions, in an embodiment, include a material that is different than the electrode material. The energized particles or the ion beam assist in controlling growth of the structure of the electrode material at the location. In some embodiments, process operation 255 is used to form a cathode film or layer 59 for a solid-state, thin-film battery. The cathode film 59 is in electrical and physical contact with the cathode contact. An electrolyte film 61 is deposited, process operation 257, on the cathode film 59. An anode film 63 is deposited, process operation 259, on the electrolyte film. The electrolyte film 61 separates the cathode and anode films 59 and 61 to prevent shorting the energy-storage device 50, e.g., battery. An anode contact is formed, process operation 261, in electrical and physical contact with the anode film. The thin-film battery according to the present invention is now formed and is subjected to post energy-storage device fabrication process operations 263.

The deposition of the cathode film includes directing a first material (e.g., adatoms) to a location on the substrate, while simultaneously supplying energized particles (e.g., ions) of a second material to the location on the substrate. In some embodiments, the second material is different from the first material. The energized particles supply energy to the first material to assist in the growth of a desirable crystal structure in the cathode film. Moreover, this controls the stoichiometry of the growing film at the location on the substrate. In one embodiment, the first material is a lithium-intercalation material used as a solid-state, thin-film battery cathode. The assist source provides ions that provide energy in a range of 5 eV to 3000 eV to the lithium-intercalation material. Control of the energy in the ions produced by the assist source provides in situ control for growing a lithium-intercalation film having a crystalline structure. The energy from the ions assists the formation of lithium-intercalation materials into a crystalline structure at the time of deposition. In one embodiment, the gas used to form the ions is used to control the stoichiometry of the growing, crystalline film. For example, an ionized, assist beam of $O_2$ is used to control the growth and stoichiometry of a $LiCoO_2$ intercalation material. In some such embodiments, the $O_2$ in the ion assist beam combines with LiCo at the location to form the LiCoO$_2$ intercalation material.

The crystalline structure of a thin film formed according to the teachings herein has a higher order than those achieved by conventional cathode film forming techniques. Conventional techniques rely on a high-temperature, post-cathode-deposition anneal to reorder and crystallize the structure of a conventional cathode film. Unfortunately, such conventional techniques anneal the entire structure to the same temperatures, which is undesirable in that the substrate must withstand such temperatures, which eliminates many otherwise suitable substrate materials from consideration. Further, different layers cannot be provided with different anneals suited to their different requirements. A highly ordered crystalline cathode film is desirably achieved according to the teachings described herein by providing the required energy to form the desired, high-order and appropriately oriented crystal structure without subjecting the substrate, and other layers formed on the substrate including the cathode-contact film to a high-temperature anneal. Further, each layer can be annealed using a different anneal process (such as using ion assist beams having different energies for different layers, or depositing and annealing at different rates or for different durations). Further, by annealing the surface layer of the previous layer, a subsequent layer can be deposited onto a surface that has been ordered in a specific way (for example, to achieve a specific crystal orientation, or a specific ion-bonding surface) that enhances the quality of that subsequent layer.

FIG. 2B shows one embodiment of a method 250B for fabricating an energy-storage device. Process operations 251, 253, 259, 261, and 263 are the substantially similar to the process operations described above with reference to FIG. 2A. Process operation 255C is a process operation for depositing a cathode film at least partially on the cathode contact film. In an embodiment, the cathode film is deposited as described above in process operation 255. In other embodiments, the cathode film is deposited according to other deposition processes known in the art. The electrolyte film is formed by depositing an electrolyte material to a location at least partially in contact with the cathode film (process operation 257B). In a preferred embodiment, the electrolyte material is in contact with a substantial portion, if not all of, a surface of the cathode film. In some embodiments, an assist source simultaneously supplies energized particles to the electrolyte material as it forms the electrolyte film. In an embodiment, the assist source supplies a beam of energized ions of an assist material different than the electrolyte material. In one embodiment, the second material beam is directed to the same location on the substrate as the electrolyte material. The energized ion beam assists in controlling growth of the structure of the electrolyte film. The ion beam is unfocused in one embodiment. The ion beam is focused in another embodiment.

The deposition of the electrolyte film includes directing an electrolyte material to a location at least partially in contact with the cathode film, while simultaneously supplying energy to the electrolyte material. In one embodiment, the energy is supplied by energized particles. In some such embodiments, the energized particles are energized ions. In some such embodiments, the energized particles from the assist source are of a different material than the electrolyte material. The energized particles supply energy to the electrolyte first material to assist in the growth of a desirable, solid electrolyte-film structure. Moreover, this controls the stoichiometry of the growing electrolyte film.

In one example, the electrolyte material is a lithium phosphorus oxynitride. In some embodiments, the assist source provides ions that provide energy in a range of about 5 eV to about 5000 eV to the lithium phosphorus oxynitride ("LiPON"). Control of the energy in the ions produced by the assist source provides in situ control for growing a lithium phosphorus oxynitride structure at the location. The energy from the ions assists the formation of the lithium phosphorus oxynitride material into a desirable structure at the time of deposition. In one embodiment, the gas used to form the ions is used to control the stoichiometry of the growing electrolyte film. For example, an ionized assist beam of O$_2$ is used to control the growth and stoichiometry of a lithium phosphorus oxynitride material. In another embodiment, an ionized assist beam of N$_2$ is used. In this embodiment, the N$_2$ not only controls growth and stoichiometry of the electrolyte film, but also injects additional nitrogen into the electrolyte film. This is desirable due to the ionic transportivity of a LiPON electrolyte film is dependant on the amount of nitrogen in the film.

Figure 2C:
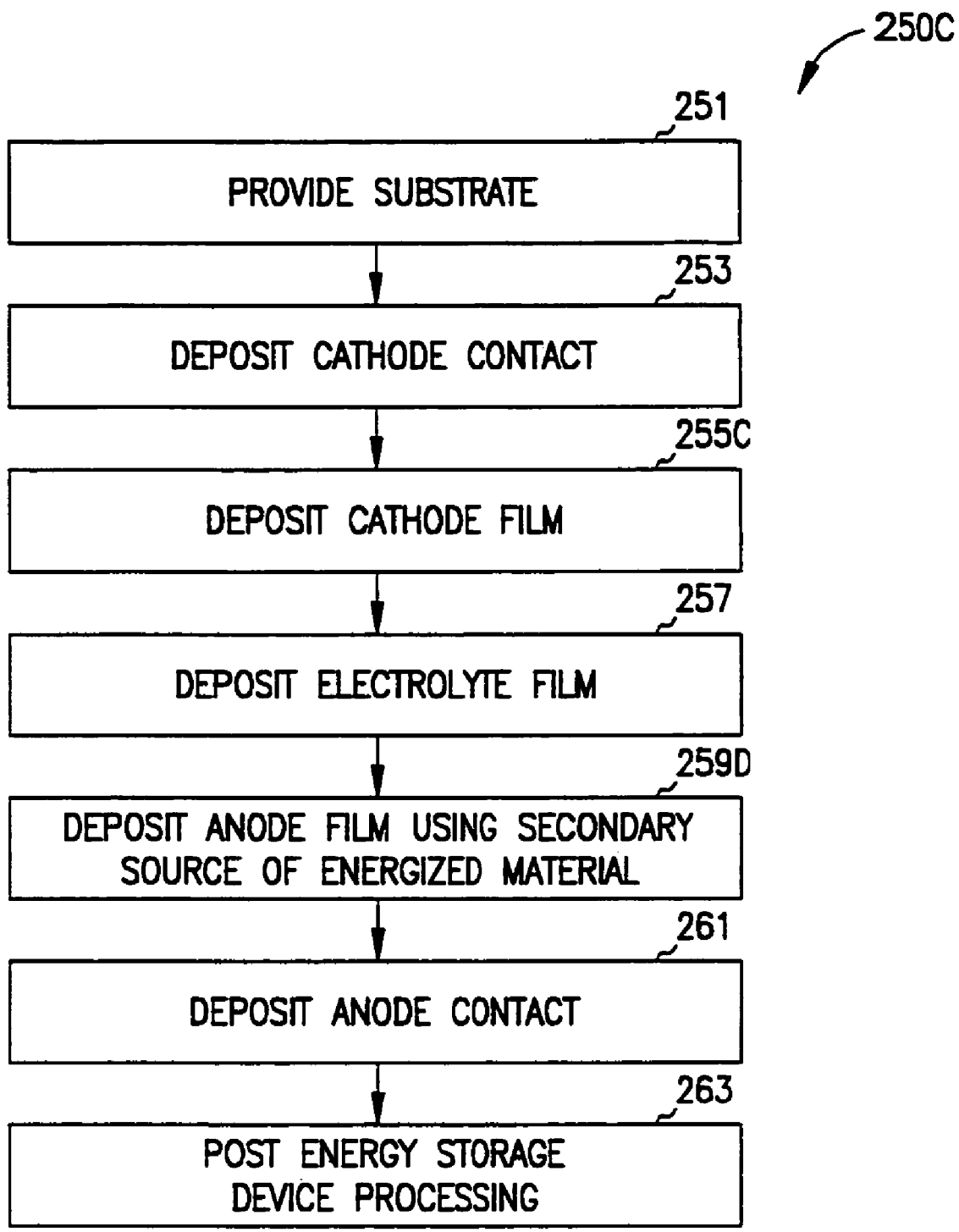
FIG. 2C is a flowchart of one embodiment of a fabrication process according to the teachings of the present invention.

FIG. 2C shows one embodiment of a method 250C for fabricating an energy-storage device. Process operations 251, 253, 257, 261, and 263 are substantially similar to the process operations described above with reference to FIG. 2A. Process operation 255C is a process operation for depositing a cathode film at least partially on the cathode contact film. In an embodiment, the cathode film is deposited as described above with reference to FIG. 2A. In other embodiments, the cathode film is deposited according to other deposition processes known in the art. Process operation 259D is a process operation for depositing an electrode material to a location at least partially on the electrolyte film, while simultaneously supplying energized particles to the electrode material. In one embodiment, the energized particles are directed to the same location as the electrode material. In an embodiment, the energized particles are energized ions. The energized ions, in an embodiment, include a second material that is different than the first material. The energized particles or the ion beam assist in controlling growth of the structure of the electrode material. Process operation 259D, in some embodiments, is used to form an anode film for a solid-state thin-film battery. The anode film is in electrical and physical contact with the anode contact and electrolyte films.

The deposition of the anode film includes directing an electrode material to a location at least partially in contact with the electrolyte film, while simultaneously supplying energized particles of a second material. The energized particles supply energy to the electrode material to assist in the growth of a desirable crystal structure in the anode film. Moreover, this controls the stoichiometry of the growing film. In one embodiment, the electrode material includes a lithium-intercalation material used as a battery anode. In an embodiment, the anode includes is a lithium metal or a lithium alloy. In another embodiment, the anode includes a carbonaceous material, such as graphite or diamond-like carbon. In another embodiment, the anode includes a metal oxide, for example, RuO or VaO. In another embodiment, the anode includes a nitride material. A secondary source provides particles, which are ions, in some embodiments, that provide energy in a range of about 5 eV to about 3000 eV to the lithium-intercalation material. In some embodiments, the ions provide energy of about 135 eV. In some embodiments, the ions provide energy in a range of about 5 eV to about 100 eV. In one embodiment, the energy range of is about 5 eV to about 1,000 eV. The energy range in a further embodiment is about 50 eV to about 90 eV. The energy range in a further embodiment is about 55 eV to about 85 eV. The energy range in a further embodiment is about 60 eV to about 80 eV. The energy range in a further embodiment is about 65 eV to about 75 eV. The energy range in a further embodiment is about 10 eV to about 100 eV. The energy range in a further embodiment is about 10 eV to about 90 eV. The energy range in a further embodiment is about 30 eV to about 300 eV. In another embodiment, the energy range is in the range of about 60 eV to 150 eV. In another embodiment, the energy of the ions from the secondary source is about 70 eV. In some embodiments, the ions provide energy in a range of about 45 eV to about 95 eV.

Control of the energy in the ions produced by the secondary source provides in situ control for growing a lithium-intercalation crystalline structure at the location. The energy from the ions assists the formation of lithium-intercalation materials into a crystalline structure at the time of deposition. In one embodiment, the gas used to form the ions is used to control the stoichiometry of the growing crystalline film.

The crystalline structure of an electrode thin film formed according to the teachings herein has a higher order than those achieved by conventional film forming techniques. Conventional techniques rely on a high-temperature, post-deposition anneal that affects the substrate and other layers as well as the film intended to reorder and crystallize the structure of that film. In contrast, the present invention provides a controlled energy source at the time of deposition or after the time of deposition that reorders the surface of the deposition film without substantially heating the underlying layers or substrate. In some embodiments, the energy is provided while depositing each atomic layer of a film such that each atomic layer is ordered as crystallizes into the film. Examples of such energy sources include an ion beam that either react with the adatoms being deposited and/or provide kinetic energy to assist in deposition of the film. Other examples of energy sources include high temperature, short duration heat sources, short duration plasma sources, lasers, other high intensity photo sources that reorder the crystal structure adjacent the surface of the film without affecting other layers or the substrate. A highly ordered crystalline cathode or anode is desirably achieved according to the teachings described herein.

While the above fabrication process describes forming cathode and anode films in a certain order, other embodiments reverse the order of the cathode film and anode film. Moreover, the fabrication process describes forming cathode and anode films, for example in a battery. In some embodiments, the cathode and anode films are electrodes of a battery. Other embodiments include films forming various layers of supercapacitors. Supercapacitors operate In these embodiments, at least one of the films forming the supercapacitor, e.g., electrode films 71, 75 and electrolyte and/or dielectric film 73, have improved crystalline structure, crystallite size, or fewer defects without resorting to a high temperature anneal of the entire structure to provide these properties. Accordingly, techniques and systems for fabricating thin films for use in an energy-storage device as described herein are applicable to both solid-state batteries and solid-state capacitors.

In another embodiment, the thin-film energy-storage device is formed on a substrate. A contact film, which is electrically conductive and does not react with a subsequently deposited, adjacent cathode film, is formed on the substrate. The contact film acts as a barrier between the substrate and the cathode film. The contact film further acts as a current collector and as a connection between the cathode film and circuits that are external to the energy-storage device. In an embodiment, the contact film has a thickness of greater than 0.3 microns.

Figure 3A:
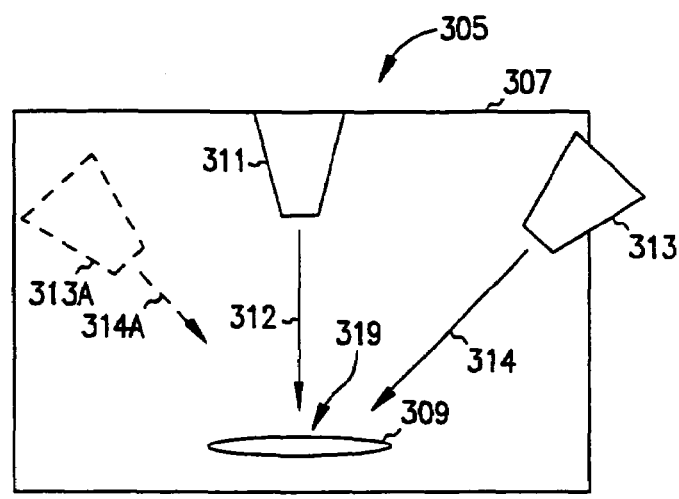
FIG. 3A is a diagram of a device for fabricating a thin-film battery according to the teachings of the present invention.

FIG. 3A shows a deposition apparatus 305 including a reaction chamber 307 in which is positioned a substrate 309 on which an energy-storage device is to be fabricated. Reaction chamber 307, in one embodiment, is a sealed chamber that holds gases for the reaction and that provides a sub-atmospheric pressure. In some embodiments, it is desirable to hold the pressure in the chamber less than about 1 times $10^{-3}$ Torr. A first material source 311 is provided in the chamber 307. The first source 311 produces a beam of adatoms 312 of a first material to be deposited on the substrate 309. In one embodiment, the first material source 311 is a physical vapor deposition source. In one such embodiment, the material source 311 is an e-beam source. In another such embodiment, the first source 311 is an arc source including, for example, a cathodic-arc source, an anodic-arc source, and a CAVAD arc source. Arc sources are particularly suited for use as a source as they effectively operate in a chamber that is operated at low temperatures. In another embodiment, the first source 311 is a physical deposition source including, for example, a sputtering source. In another embodiment, the source 311 is a chemical vapor deposition source including, for example, a direct ion source using a hydrocarbon precursor gas. Beam 312 is focused on a location 319 on the substrate 309 whereat the material of the beam 312 is deposited to form a film of an energy-storage device. An assist source 313 is provided in the chamber 307 and produces a beam of energized particles 314 directed at least adjacent to the location 319 on the substrate 309. In some embodiments, the assist source is an energized ion-producing source. In some embodiment, the assist source 313 is offset from the first source 311 such that the beams from these sources are not coincident. The energized particle beam 314 provides the energy that is required to control the growth and stoichiometry of the material in the first beam 312 into a crystalline structure on the substrate 309 as is explained in greater detail herein. In one embodiment, the energized particle beam 314 also provides elements that are required in the film being deposited. In another embodiment, beam 314 is directed at least near location 319 such that sufficient energy to form the desired crystal structure and stoichiometry of the film being deposited is supplied by beam 314 to the material in first beam 312. In some embodiments, the deposition system 305 includes at least one additional assist source 313A. In some embodiments, each of the additional sources 313A provides an additional assist beam 314A that provides energy to arriving adatoms at the substrate. Various embodiments of assist beams 314 are described below.

Figure 3B:
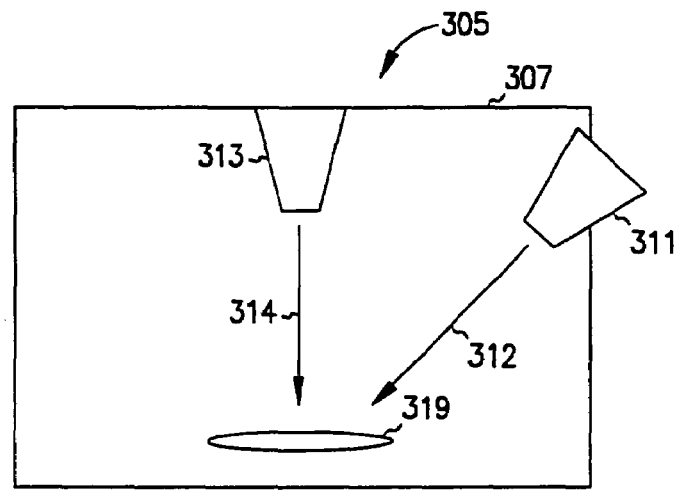
FIG. 3B is a diagram of a device for fabricating a thin-film battery according to the teachings of the present invention.

FIG. 3B shows another embodiment of a deposition apparatus 305. The assist source 313 produces an energy beam 314 that travels along a path that is essentially normal to the substrate 319. The source of material to be deposited 311 is offset from assist source 313. In some embodiments, source 311 produces a beam of adatoms 312 that travels along a path that is non-normal to the substrate 319. The energy beam supplies energy to the adatoms from beam 312 as described herein.

Figure 4:
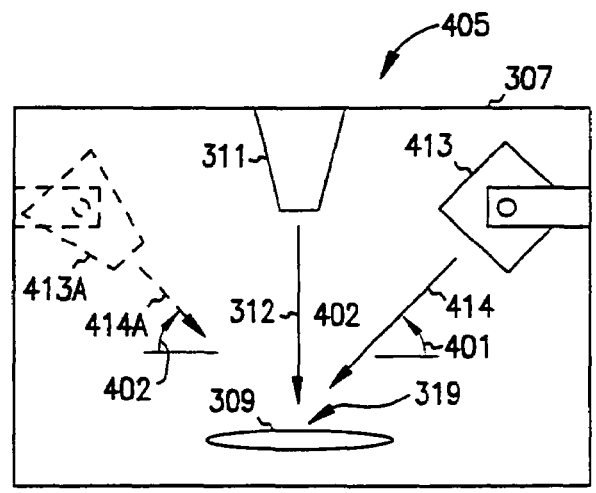
FIG. 4 is a diagram of another embodiment of a device for fabricating a thin-film battery according to the teachings of the present invention.

FIG. 4 is a view substantially similar to FIG. 3A, except that depositing apparatus 405 includes an assist source 413 for producing the energized beam that is pivotally mounted to a bracket fixed in the chamber 307. The assist source 413 pivots to direct the energized particle beam 414 at a desired impingement angle to the surface of the substrate 309. In an embodiment, the impingement angle 401 is in the range of about 15 degrees to about 70 degrees from normal to the substrate. Accordingly, in some embodiments, the impingement angle 401 is variable. In one embodiment, the impingement angle is about 45 degrees. In some embodiments, the deposition system 405 includes at least one additional assist source 413A. In some embodiments, each of the sources 413A provides an additional assist beam 414A at an angle 402 that provides energy to arriving adatoms at the substrate. In some embodiments, the energy provided by assist beam 414 differs from the energy provided by at least one of assist beams 414A. In some embodiments, the assist beam 414 and 414A need not simultaneously transmit energy to the adatoms. In some embodiments, the means by which the beams 414 and 414A transmit energy are different. In some embodiments, the material in beams 414 and 414A are different.

Figure 5A:
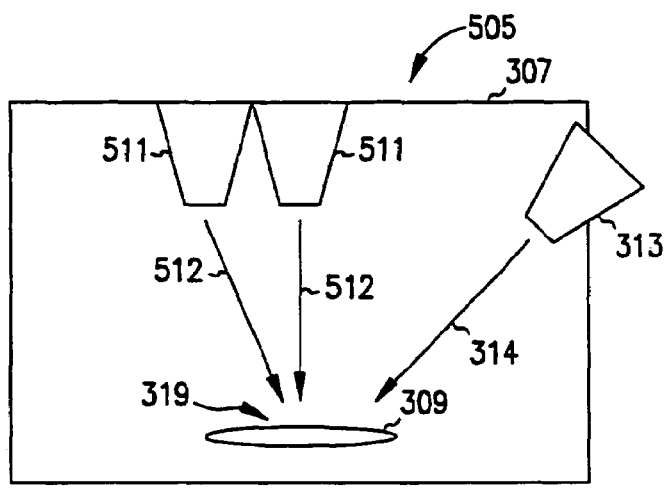
FIG. 5A is a diagram of another embodiment of a device for fabricating a thin-film battery according to the teachings of the present invention.

FIG. 5A is a view substantially similar to FIG. 3 except that depositing apparatus 505 includes a plurality of first deposition sources 511. In one embodiment, each one of the first deposition sources 511 directs its respective beam 512 to the location 319 on the substrate 309. In some embodiments, every one of the first sources 511 produces a beam 512 including the same material. In other embodiments, at least of the first sources 511 produces a beam 512 of a material that is different than that of another of the first sources 511. In some embodiments, the materials from the plurality of first beams 512 combine at the location 319 to form the desired film. In other embodiments, the materials in first beams 512 combine with material from assist beam 314 to form the desired film. In one embodiment, one of the first sources 511 directs its beam 512 to the substrate 319 but away from the location 319. In some embodiments, two or more assist sources 313 provide energy to the adatoms of beams 512.

Figure 5B:
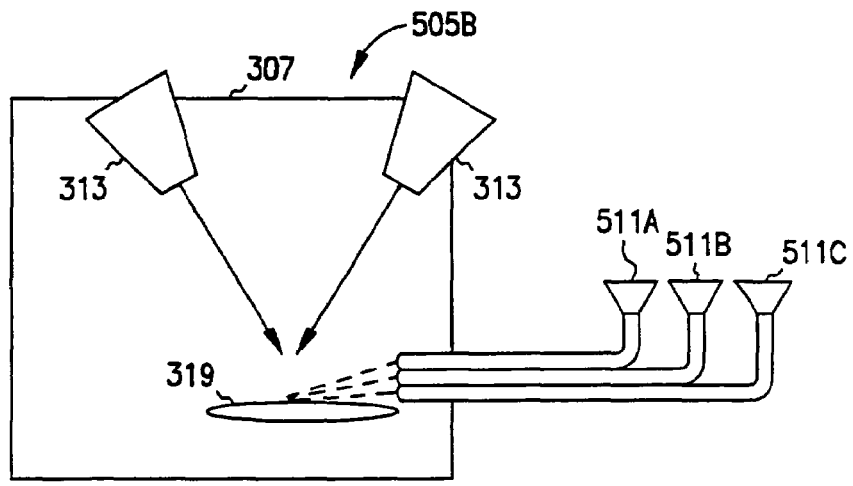
FIG. 5B is a diagram of another embodiment of a device for fabricating a thin-film battery according to the teachings of the present invention.

FIG. 5B shows another embodiment of a depositing apparatus 505B. A plurality of assist sources 313 is positioned to provide energy to a forming film at the substrate 319. A plurality of material sources 511A, 511B, and 511C supply material to the chamber 307 and adjacent the surface of the substrate 319. In some embodiments, each of the material sources 511A, 511B, and 511C provide a same material and, thus, have the ability to provide a greater quantity than one of the sources alone. In some embodiments, at least one of the material sources 511A, 511B, and 511C provides a material different than another of the material sources. In some embodiments, these different materials react at the in chamber 307 to create the adatom material that will form a film on the substrate 319. In some embodiments, at least one of the material sources 511A, 511B, and 511C provides a precursor material into chamber 307 and another of the material sources provides a reactant material into the chamber. The precursor and reactant material react together to create the material that will form the film. In some embodiments, at least one of the material sources 511A, 511B, and 511C includes a chemical reactor in which chemicals react. This source then injects the resultant material into the chamber. The resultant material is included in the film fabrication process.

Figure 6:
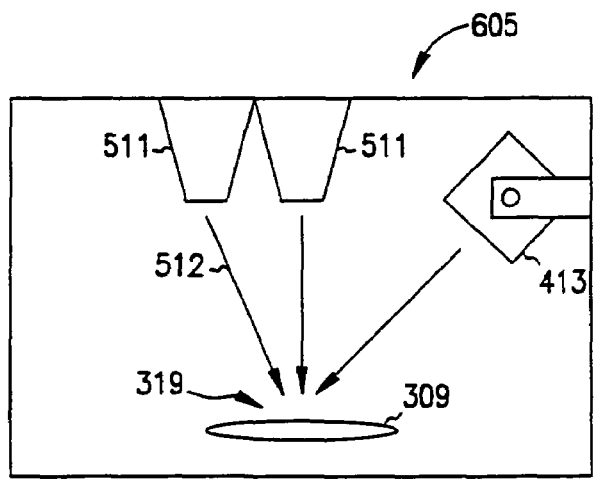
FIG. 6 is a diagram of another embodiment of a device for fabricating a thin-film battery according to the teachings of the present invention.

FIG. 6 is a view substantially similar to FIG. 5A except that depositing apparatus 605 includes a plurality of first deposition sources 511 and a pivotable assist source 413. In some embodiments, this provides more material to a given deposition location. In some embodiments, this provides deposition at multiple locations. In still other embodiments, this allows different materials from different sources to be combined.

Figure 7:
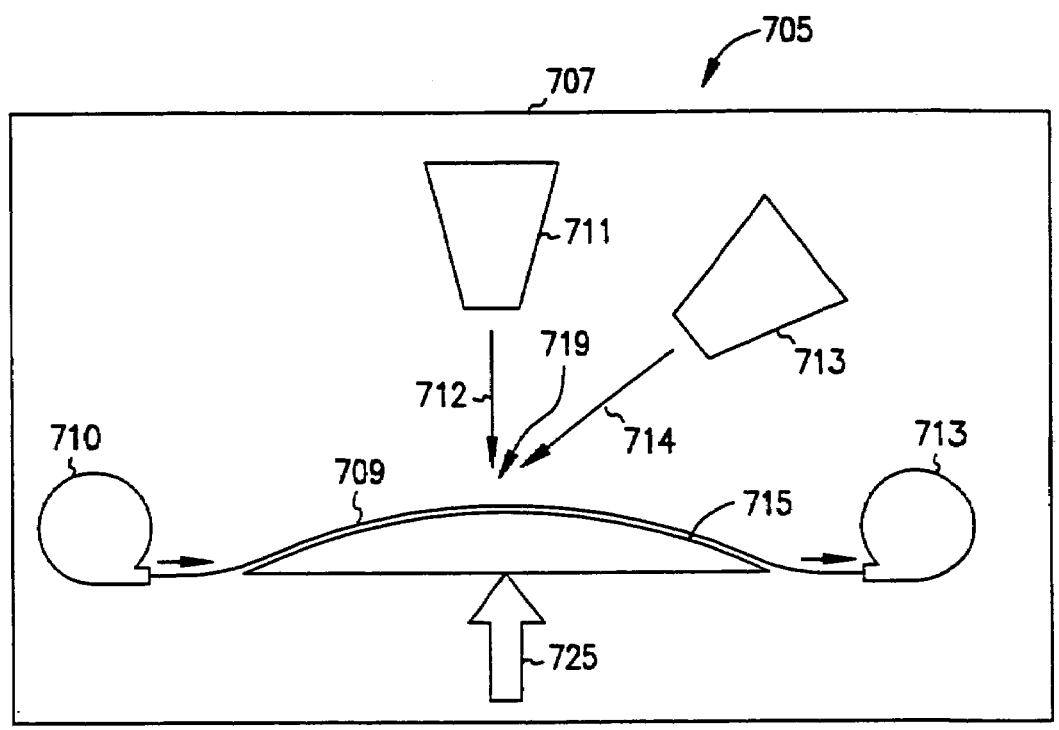
FIG. 7 is a diagram of another embodiment of a device for fabricating a thin-film battery according to the teachings of the present invention.

FIG. 7 shows another embodiment of a depositing apparatus 705 according to the teachings of the present invention. Depositing apparatus 705 includes a reaction chamber 707 in which is positioned an elongate, flexible substrate 709 on which an energy-storage device is to be fabricated. The substrate 709 is fed from a source roll 710 over an arched thermal control surface 715 and taken up by an end roll 713. A first material source 711 is provided in the chamber 707 and is a physical deposition source. First source 711 produces a beam of adatoms 712 of a material to be deposited on the substrate 709. In one embodiment, the first source 711 is an arc source including, for example, a cathodic arc source, an anodic arc source, and a CAVAD arc source. In another embodiment, the first source 711 is a physical vapor deposition source including, for example, a sputtering source. In another embodiment, source 711 is a chemical vapor deposition source. Moreover, source 711, in some embodiments, represents a plurality of different material sources. Beam 712 is focused on a location 719 on the substrate 709 whereat the adatoms in the beam are deposited to form a film layer of an energy-storage device. An assist source 713 is provided in the chamber 707 and produces a beam of energized particles 714 directed at the substrate 709. In an embodiment, the assist source 713 produces a beam of energized ions 714. The energized particle beam 714 provides the energy required to control growth and stoichiometry of the deposited material of the first beam 712. Thus, a crystalline structure is formed on the substrate 709 as is explained in greater detail herein. The substrate 709, in one embodiment, is an elastomer, polymer, or plastic web or sheet on which the energy-storage device is fabricated. Substrate 709 being elongate allows a plurality of energy-storage devices to be deposited on successive locations of the substrate, thereby improving the rate of energy device production. Moreover, a plurality of deposition apparatuses 705 or sources 711, in some embodiments, is provided for simultaneously depositing a plurality of films at different locations on the substrate 709.

The thermal control surface 715 is connected to a thermal source 725, which controls the temperature of surface 715. The substrate 709 is in thermodynamic contact with surface 715 to thereby control the temperature of the substrate as needed for a particular deposition process on a particular substrate. In one embodiment, the thermal source is a coolant source, for example a cryogenic vacuum pump that releases compressed helium toward the surface 715 to cool it. The use of a thermally controlled surface 715 in direct contact with the substrate 709, especially when the direct contact is aligned or coincident with the location whereat a thin film is being formed, allows the use of substrates that have lower thermal degradation temperatures than are possible using conventional solid-state thin-film battery fabrication processes.

The above provides descriptions of various embodiments of systems in which the present invention is performed to produce energy-storage devices or energy-conversion devices. It is within the scope of the present invention to combine the elements of the systems in different ways than shown and described as long as the methods described herein are performable with such a system. For example, in some embodiments, the flexible substrate 709 and rolls 710, 713 can be combined with any of the embodiments shown in FIGS. 3A-6. In some embodiments, the thermal source 725 is also combinable with any of the embodiments of FIGS. 3A-6. In some embodiments, the pivotable assist sources 413 are combinable with any of the embodiments of FIGS. 3A, 3B, 5A, 5B, and 7. In some embodiments, the material sources 511A, 511B, and 511C are combinable with embodiments of FIGS. 3A-5A and 6-7.

In one embodiment, the electrode second film, e.g., films 59 or 71 is a lithium-intercalation material which overlays at least part of the first film, e.g., contact films 57 or 63, but does not extend beyond the boundary of the first film. Thus, the intercalation second film remains in a solid state during discharging and charging of the energy-storage device. In some embodiments, the second film is deposited using the first deposition source simultaneously with the secondary source supplying energetic ions to the growing second film. In some embodiments, the first deposition source is a physical vapor deposition source. In some embodiments, the secondary source is an ion source supplying energetic ions from a source gas comprising oxygen (e.g., $O_2$) or nitrogen (e.g., $N_2$). The source gas, in another embodiment, comprises a noble gas, e.g., argon, xenon, helium, neon, and krypton. The source gas, in yet another embodiment, comprises a hydrocarbon material such as a hydrocarbon precursor. Selection of the secondary source gas is based on the desired effect on the stoichiometry of the deposited film. The secondary source, in one embodiment, provides a focused beam of energized ions. The secondary source, in one embodiment, provides an unfocused beam of energized ions. The energized ions provide energy to the lithium-intercalation material in the range of about 5 eV to about 3,000 eV. In one embodiment, the energy range of is about 5 eV to about 1,000 eV. The energy range in a further embodiment is about 10 eV to about 500 eV. The energy range in a further embodiment is about 30 eV to about 300 eV. In another embodiment, the energy range is in the range of about 60 eV to 150 eV. In another embodiment, the energy range is about 140 eV. In some embodiments, the ions provide energy of about 135 eV. In some embodiments, the ions provide energy in a range of about 5 eV to about 100 eV. In one embodiment, the energy range of is about 5 eV to about 1,000 eV. The energy range in a further embodiment is about 50 eV to about 90 eV. The energy range in a further embodiment is about 55 eV to about 85 eV. The energy range in a further embodiment is about 60 eV to about 80 eV. The energy range in a further embodiment is about 65 eV to about 75 eV. The energy range in a further embodiment is about 10 eV to about 100 eV. The energy range in a further embodiment is about 10 eV to about 90 eV. The energy range in a further embodiment is about 30 eV to about 300 eV. In another embodiment, the energy range is in the range of about 60 eV to 150 eV. In another embodiment, the energy of the ions from the secondary source is about 70 eV. In some embodiments, the ions provide energy in a range of about 45 eV to about 95 eV.

In an embodiment, the second film has a thickness of greater than 10 microns. In one embodiment, the second film has a thickness in the range of about 10 to 20 microns. In one embodiment, the second film has a thickness in the range of about 1 to 5 microns.

An electrolyte third film, e.g., films 61, 61C or 73, having ionic transport qualities but not being electrically conductive (an electrolyte) is deposited so as to completely overlay the second deposited film. In one embodiment, the third film is deposited using a first deposition source and a secondary source supplying energetic ions to the growing film. In some embodiments, the first deposition source is a physical vapor deposition source. In some embodiments, the secondary source is an ion source with the capability of supplying energetic ions having energy greater than 5 eV. In another embodiment, the energy range is about 5 eV to about 3,000 eV. In one embodiment, the energy range of is about 5 eV to about 1,000 eV. The energy range in a further embodiment is about 10 eV to about 500 eV. The energy range in a further embodiment is about 30 eV to about 300 eV. In another embodiment, the energy range is in the range of about 60 eV to 150 eV. In another embodiment, the energy of the ions from the secondary source is about 140 eV. In some embodiments, the ions provide energy of about 135 eV. In some embodiments, the ions provide energy in a range of about 5 eV to about 100 eV. In one embodiment, the energy range of is about 5 eV to about 1,000 eV. The energy range in a further embodiment is about 50 eV to about 90 eV. The energy range in a further embodiment is about 55 eV to about 85 eV. The energy range in a further embodiment is about 60 eV to about 80 eV. The energy range in a further embodiment is about 65 eV to about 75 eV. The energy range in a further embodiment is about 10 eV to about 100 eV. The energy range in a further embodiment is about 10 eV to about 90 eV. The energy range in a further embodiment is about 30 eV to about 300 eV. In another embodiment, the energy range is in the range of about 60 eV to 150 eV. In another embodiment, the energy of the ions from the secondary source is about 70 eV. In some embodiments, the ions provide energy in a range of about 45 eV to about 95 eV.

In some embodiments, the secondary source includes oxygen (e.g., $O_2$) or nitrogen (e.g., $N_2$) gas. The secondary source gas, in another embodiment, includes a noble gas, e.g., argon, xenon, helium, neon, and krypton. The secondary source gas, in another embodiment, includes a hydrocarbon material such as a hydrocarbon precursor. Selection of the secondary source gas is based on the desired effect on the stoichiometry of the deposited film. The secondary source, in one embodiment, provides a focused beam of energized ions. The secondary source, in one embodiment, provides a non-focused beam of energized ions. It is desirable to make the electrolyte, third layer as thin as possible and prevent the cathode and anode layers from shorting. In an embodiment, the third film has a thickness of less than 1 micron. In one embodiment, the third film has a thickness in of less than 5,000 Angstroms. In another embodiment, the third film has a thickness of less than 1,000 Angstroms. In another embodiment, the third film has a range of about 10 Angstroms to about 100 Angstroms.

In another embodiment, the third film is deposited using a first source supplying energetic ions (5 to 3000 eV) to a material source (target) at an impingement angle of 15 to 70 degrees and a second source supplying energetic ions to the growing film. The first deposition source includes a beam of focused energetic ions from a source gas. The source gas includes one of the sources gases described herein.

An anode, fourth film, e.g., film 65 or 75 includes from a lithium-intercalation material that is deposited on and overlays the third film but not contacting first film (barrier) or second film (cathode). In one embodiment, the fourth film is deposited using a first deposition source simultaneously with a secondary source supplying energetic ions to the growing fourth film. In some embodiments, first deposition source is a physical vapor deposition source. In some embodiments, the secondary source is an ion source supplying energetic ions from a source gas that includes oxygen (e.g., $O_2$) or nitrogen (e.g., $N_2$). The source gas, in another embodiment, includes a noble gas, e.g., argon, xenon, helium, neon, and krypton. The source gas, in another embodiment, includes a hydrocarbon material such as a hydrocarbon precursor. Selection of the secondary source gas is based on the desired effect on the stoichiometry of the deposited film. The secondary source, in one embodiment, provides a focused beam of energized ions. The secondary source, in another embodiment, provides an unfocused beam of energized ions. The energized ions provide energy to the lithium-intercalation material in the range of about 5 eV to about 3,000 eV. In one embodiment, the energy range of is about 5 eV to about 1,000 eV. The energy range in a further embodiment is about 10 eV to about 500 eV. The energy range in a further embodiment is about 30 eV to about 00 eV. In another embodiment, the energy range is in the range of about 60 eV to 150 eV. In another embodiment, the energy range of the ions from the secondary source is about 140 eV. In an embodiment, the fourth film has a thickness of greater than 10 microns. In one embodiment, the fourth film has a thickness in the range of about 10 to 40 microns.

In another embodiment, the fourth film is deposited by plasma decomposition of hydrocarbon pre-cursor(s) at the surface of the substrate thereby forming a lithium-intercalation anode. In some embodiments, deposition is performed by plasma enhanced CVD using hydrocarbon precursors. In one embodiment, the deposition includes dopants such as $N_2$. In one embodiment, a secondary source provides energized ions to assist in the deposition of the fourth film. The energized ions provide energy in the range as described herein. In some embodiments, the secondary source is the same as any described herein.

In another embodiment, the anode, fourth film is deposited by direct ion beam deposition of a lithium-intercalation material using hydrocarbon precursors. The first deposition source provides a beam of focused energetic ions (5 to 3000 eV) from a source gas hydrocarbon precursor directed at the target material. In one embodiment, a secondary source supplies energetic ions to assist in growing the fourth film and is a secondary source as described herein.

A contact, fifth film, e.g., film 65 or 77, which is electrically conductive and does not react with the fourth film, is formed in contact with at least part of the fourth film. The fifth film does not contact the second film (cathode). In an embodiment, the fifth film has a thickness of greater than 0.5 microns. The fifth film acts as an anode current collector for contact to external circuitry.

In some embodiments, a passivation, sixth film 79, which is electrically non-conductive and chemically inert, essentially overlays the energy-storage device as formed thus far, i.e., all the second, third, and fourth films, so that same are packaged and free from environmental contaminants that may react with these films and degrade performance of the energy-storage device. Environmental contaminants may include further fabrication materials for devices with the energy-storage device integrated therewith. In some embodiments, the first and fifth contact films are partially exposed outside the sixth film for connection to circuitry outside the energy-storage device.

The substrate 55, 309 or 709, on which the films described herein are deposited, includes any material capable of supporting a thin film and being able to withstand the deposition process described herein. In one embodiment, the substrate is formed of a material having a temperature at which it will begin to degrade due to thermal effects of less than 700 degrees Celsius. A further embodiment includes a substrate having such a temperature at which it experiences thermal degradation of less than or equal to about 300 degrees Celsius. Thermal degradation of the substrate includes loss of shape of the substrate, loss of sufficient rigidity to support an energy-storage device, chemical breakdown of the substrate, cross-linking of materials on the substrate and/or films, melting, and combustion. Examples of substrates include silicon wafers and silicon on insulator structures.

Other examples of substrate materials include metals on which an insulator layer is formed prior to formation of the energy-storage device as described herein. In another example, the metal may act as a contact for the energy-storage device with insulator layers electrically separating the electrolyte film, the anode film and the anode contact from the metal substrate. Examples of other materials that have a low thermal degradation temperature that are suitable for fabricating an energy-storage device as disclosed herein include paper, fabrics (natural and synthetic), polymers, plastics, glasses, and ceramics.

The substrate 55, 309, or 709 has a form that is applicable to the type of apparatus used to fabricate the energy-storage device according to the teachings herein. One example of the substrate shape is a semiconductor wafer. Other forms of the substrate include elongate webs, weaves, foils, and sheets. It is within the scope of the present invention to provide a substrate having sufficient size on which a plurality of energy-storage devices and/or a plurality of energy conversion devices are fabricated.

One embodiment of the substrate 55, 309, or 709 includes a substrate that retains its support characteristics during an in situ temperature treatment. In the in situ temperature treatment, the substrate is placed in intimate contact with a thermally controlled surface, e.g., surface 715. In one embodiment, the thermally controlled surface is a cooled surface such that heat associated with deposition of any of the films described herein are thermally balanced so as not to thermally degrade the substrate or any other structural element previously formed on the substrate. Thus, in some embodiments, substrates having low thermal degradation temperatures, such as low melting points or low combustion temperatures, are used as substrates in the present fabrication methods. For example, substrates include ceramics, glasses, polymers, plastics and paper based materials. In an embodiment according to the teachings herein, the substrate is a plastic or metal substrate on which a plurality of energy-storage devices is deposited. The substrate is then divided into separate dies having at least one energy-storage device thereon. The dies then can be worked, e.g., cold worked, into a desired shape as dictated by the energy-storage device application.

In another embodiment, the substrate is made of a flexible material, e.g., substrate 709. The flexible substrate is formed into an elongate roll that is caused to pass over a curved object, which forces the material into intimate contact with the surface of the curved object. The curved object is a thermally controlled device (e.g., device 725 as shown in FIG. 7) to control the temperature of the substrate and balance the effect of heat generated on the substrate and films thereon during deposition. For example, the object is hollow and sealed from the environment of the deposition vessel. In some embodiments, the hollow space is filled with a coolant, e.g., cryogenic gas such as gas obtained from $LN_2$ or liquid helium, with the coolant being constantly replenished. An area of intimate contact between the substrate and object is coincident and opposite the location of material impingement on the substrate from the deposition source. In another embodiment, the coolant is chilled water that is constantly being replenished. In another embodiment, an electro-thermal cooling apparatus thermally controls the curved object. In another embodiment, the curved object is a drum, which is either stationary or rotatable about its axis in the direction of substrate movement.

In another embodiment, the substrate 55 or 309 is formed of a strip of rigid material. The rigid substrate is made to pass over a cooled, thermally controlled surface. Examples of the cooled surface are described herein. One such example is a cooled surface that is cooled by the release of cryogenic fluid such as liquid $N_2$ or liquid helium into passages within the body of object having the surface but sealed from the environment of the deposition chamber. Other coolant sources include chilled water, cryogenic gas, and electro-thermal devices.

Figure 8A:
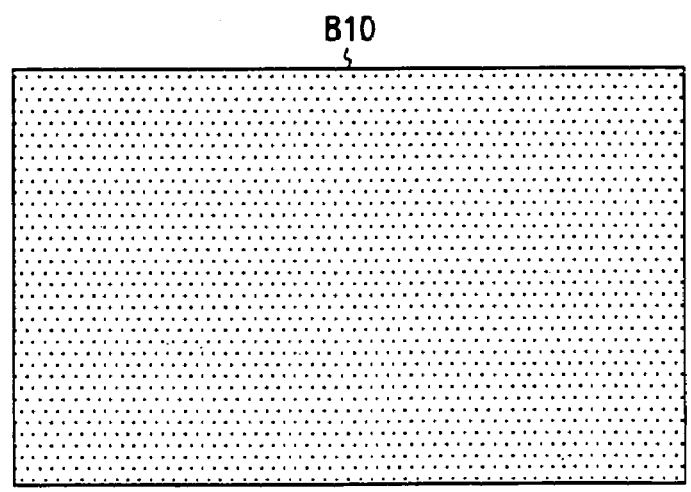
FIG. 8A shows a plan view of a starting substrate of an embodiment that will have an integrated battery and device sharing a common terminal.

FIG. 8A shows a plan view of a starting substrate 810 of an embodiment that will have an integrated battery and device sharing a common terminal. FIG. 8F shows an elevation view of the starting substrate of FIG. 8A.

Figure 8B:
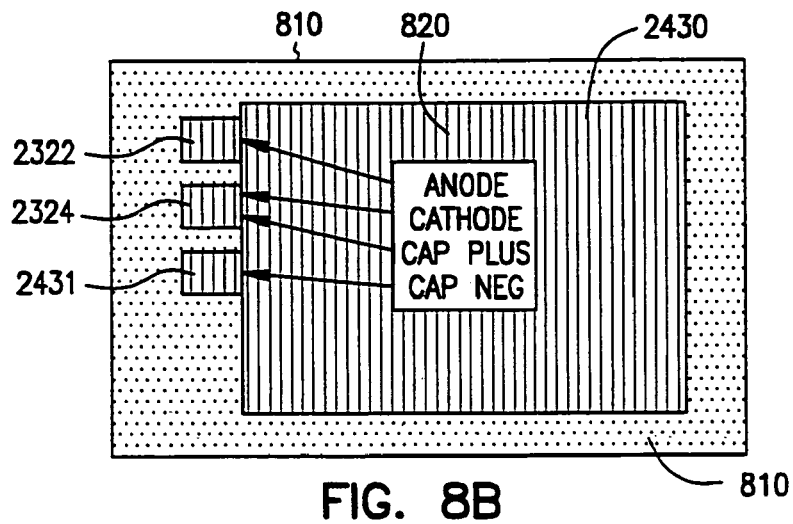
FIG. 8B shows a plan view of the substrate of FIG. 8A after deposition of the integrated battery and device sharing a common terminal.

FIG. 8B shows a plan view of the substrate 810 of FIG. 8A after deposition of the integrated battery 820 and device 2430 sharing a common terminal. In some embodiments, integrated battery 820 and device 2430 are a thin-film battery and a circuit, respectively, having electrical connections 2322, 2324, and 2431. FIG. 8G shows an elevation view of the partially built device of FIG. 8B.

Figure 8C:
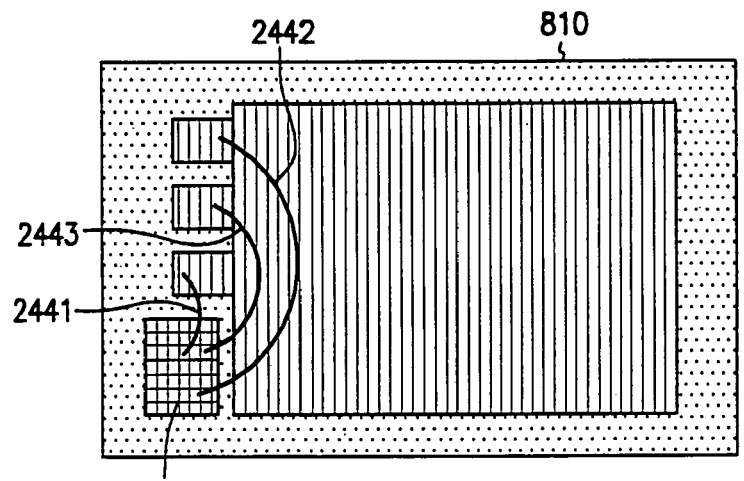
FIG. 8C shows a plan view of the substrate of FIG. 8B after placing and wiring a separately fabricated chip connected to the integrated battery and device sharing a common terminal.

FIG. 8C shows a plan view of the substrate of FIG. 8B after placing and wiring a separately fabricated chip 2440 connected by wires 2441, 2442, and 2443 to the integrated battery 2320 and device 2430 sharing common terminal 2324. FIG. 8H shows an elevation view of the partially built device of FIG. 8C.

Figure 8D:
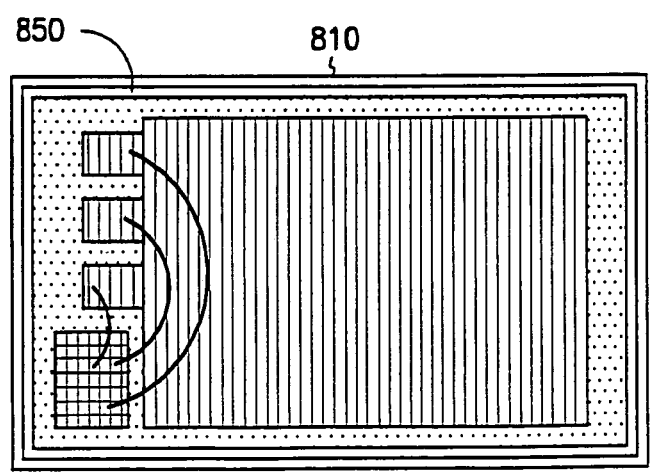
FIG. 8D shows a plan view of the substrate of FIG. 8C after placing and wiring a loop antenna.

FIG. 8D shows a plan view of the substrate 810 of FIG. 8C after placing and wiring a loop antenna 850 used in some embodiments. FIG. 8I shows an elevation view of the partially built device of FIG. 8D.

Figure 8E:
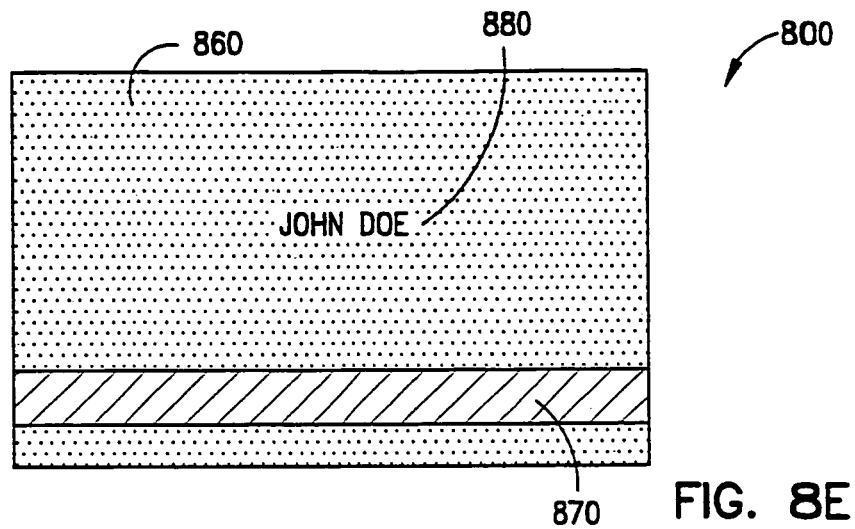
FIG. 8E shows a plan view of the substrate of FIG. 8D after a top encapsulation layer has been deposited.
Figure 8F:
FIG. 8F shows an elevation view of the starting substrate of FIG. 8A.
Figure 8G:
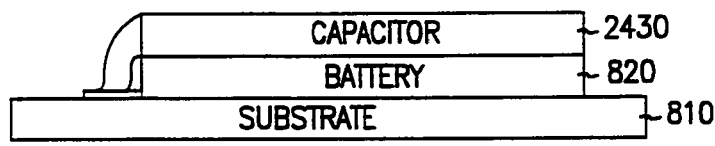
FIG. 8G shows an elevation view of the partially built device of FIG. 8B.
Figure 8H:
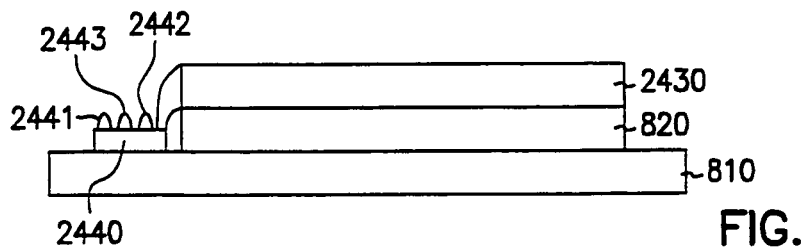
FIG. 8H shows an elevation view of the partially built device of FIG. 8C.
Figure 8I:
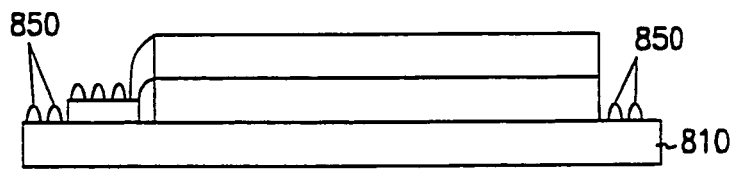
FIG. 8I shows an elevation view of the partially built device of FIG. 8D.

FIG. 8E shows a plan view of the final device 800 having the partially built device of FIG. 8D after a top encapsulation layer 860 has been deposited. In some embodiments, device 800 includes embossed and/or printed matter 880, and/or a magnetically readable strip 870.

Figure 8J:
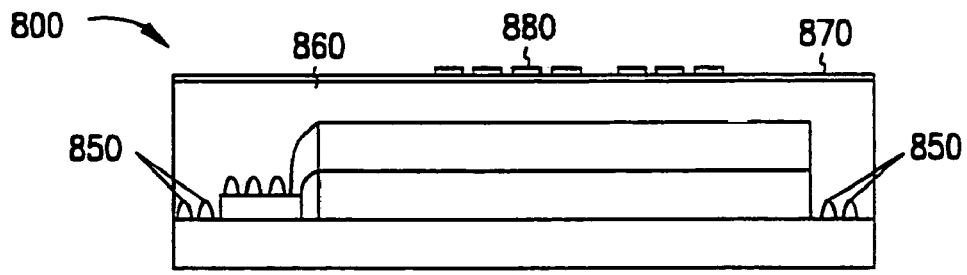
FIG. 8J shows an elevation view of the device of FIG. 8E.

FIG. 8J shows a cross-section elevation view of the device 800 of FIG. 8E. The elevational views of FIGS. 8E-8J are not to scale. In some embodiments, device 800 is approximately the size and thickness of a common credit card. In some embodiments, a magnetic strip 870 and raised lettering 880 are also fabricated on device 800.

Figure 8K:
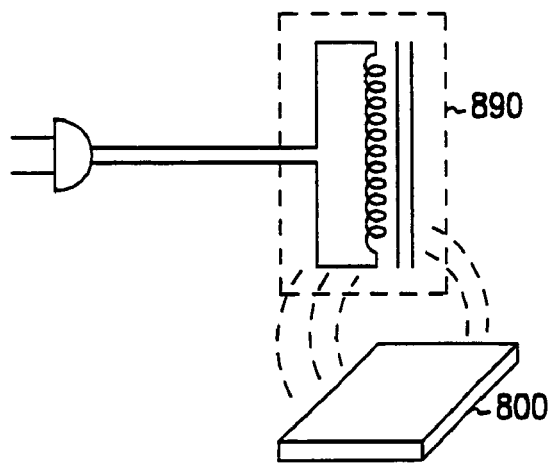
FIG. 8K shows a perspective view of the device of FIG. 8E at a magnetic-recharging station.

FIG. 8K shows a perspective view of the device of FIG. 8E at a magnetizing station. In the embodiment shown, coil 890 uses house current to generate a 60 Hz magnetic field, and together with coil 850, form a transformer inducing current flow in coil 850 (not labeled), which is rectified and used to enable closing of a switch. When the switch is closed, an attached circuit performs a task. One example application of such a system will now be discussed. Currently, magnetic stations are used to disable anti-theft circuits. The magnetic field essentially disables a resonant frequency antenna of the anti-theft device so that as the purchaser walks through a reader at a retail establishment, the antenna will not enable an alarm. In this embodiment of the invention, the magnetic field used to disable the anti-theft device enables a switch, which in turn powers a circuit. In one embodiment, the circuit begins a clock marking the beginning of a warranty period associated with a product purchased.

Figure 8L:
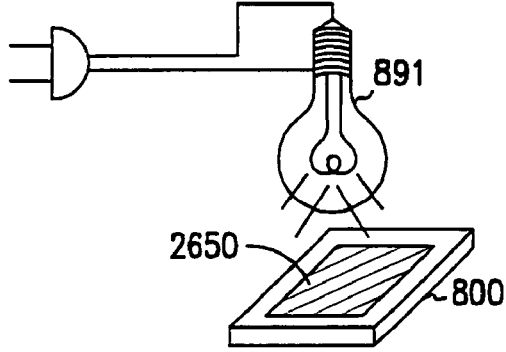
FIG. 8L shows a perspective view of the device of FIG. 8E at a light-recharging station.

FIG. 8L shows a perspective view of a device 800 of FIG. 8E, but further including a photovoltaic cell 2650. In some embodiments, device 800 is fabricated as part of a shipping label. The shipping label includes an opaque peel off backing. Once peeled, light strikes the photo voltage cell and closes a switch to power a circuit. In one embodiment, the circuit begins a clock marking the beginning of a warranty period associated with a product purchased.

Figure 8M:
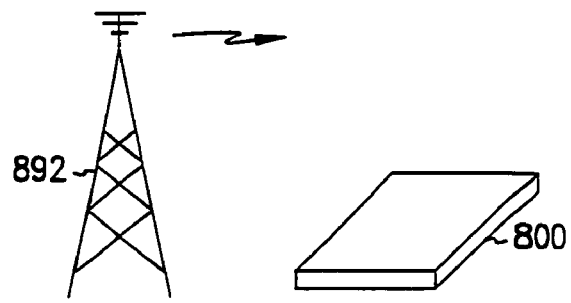
FIG. 8M shows a schematic of the device of FIG. 8E at a radio-wave-recharging station.

FIG. 8M shows a schematic of the device of FIG. 8E at a radio-wave station 892. Radio waves from radio-wave station 892 are picked up by antenna 850, and the received radio wave's power is scavenged to close a switch and implement in circuit 2440. In one embodiment, the circuit begins a clock marking the beginning of a warranty period associated with a product purchased.

Solid-state rechargeable batteries such as those described above have the unique ability of being integrated directly with the electronics they will power. Further integration of thin-wire antenna/coil 2660 or 850 to be used as one of the coils of a two-part transformer such as shown in FIG. 8K and/or RF-scavenging technology such as that used in keyless entry systems allows the recharging of the solid-state thin-film battery 2320 wirelessly (through the air). Using techniques already common in RF I.D. tagging, the communicated energy is converted into a D.C. voltage and used to perform functions on board. In the case where a battery already exists on board, the D.C. voltage is used to power up recharge circuitry to wirelessly recharge the on-board battery.

Certain needs exist within industry that would benefit from the integration of energy, storage and electronics on a single platform.

The present invention provides a platform integrating electronics, solid-state batteries, and an event-activated switch in a single platform. In many instances, the system or platform has a very small form factor. FIGS. 9A to 20 show schematics of such systems or platforms. Discussions of specific examples follow.

Figure 9A:
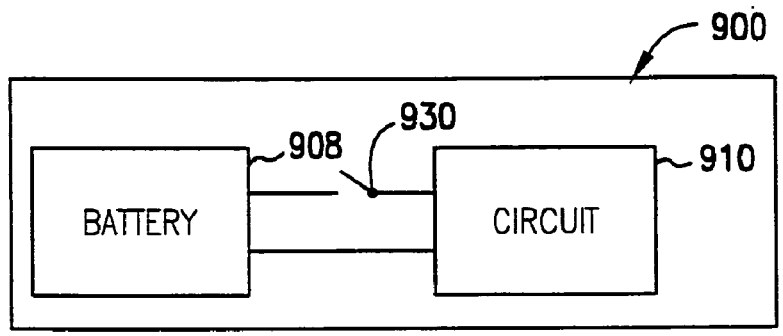
FIG. 9A shows a schematic drawing of a system including a battery, a circuit and an activity-activated switch, wherein the activity-activated switch is in the open position.
Figure 9B:
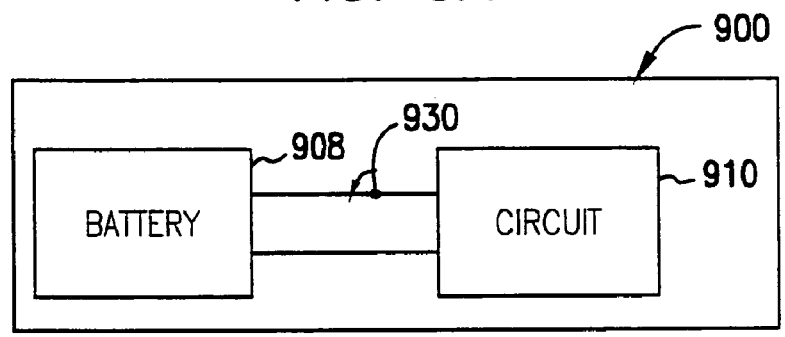
FIG. 9B shows a schematic drawing of a system including a battery, a circuit and an activity-activated switch, wherein the activity-activated switch is in the closed position.

FIGS. 9A and 9B show a schematic diagram of a system 900 including a battery 908, a circuit 910, and an activity-activated switch 930. The battery 908 is formed or may be formed as discussed with respect to FIGS. 1A-8M. The battery 908 is typically a thin-film battery formed on a substrate, such as substrate 55 shown in FIGS. 1A-1D. The circuit may be incorporated and attached to the battery 908 on the substrate 55. In the alternative, the circuit 910 may be formed upon a substrate 55 and the battery 908 formed atop the circuit 910. An activity-activated switch 930 (such as a MEMS switch activated by acceleration, magnetism, electrostatic charge, etc., such as described below) is also formed on the substrate along with the battery 908 and the circuit 910. FIG. 9A shows a system 900 or a platform that integrates electronics in the form of a circuit 910, a solid-state battery 908, and an event-activated switch 930, wherein the event-activated switch is deactivated or open. FIG. 9B shows the same system 900 or platform wherein the switch 930 has been activated placing the solid-state battery in electrical communication with the circuit or electronics 910. The circuit 910 or electronics are then powered to perform certain tasks in response to being activated by the activity-activated switch 930.

Figure 9C:
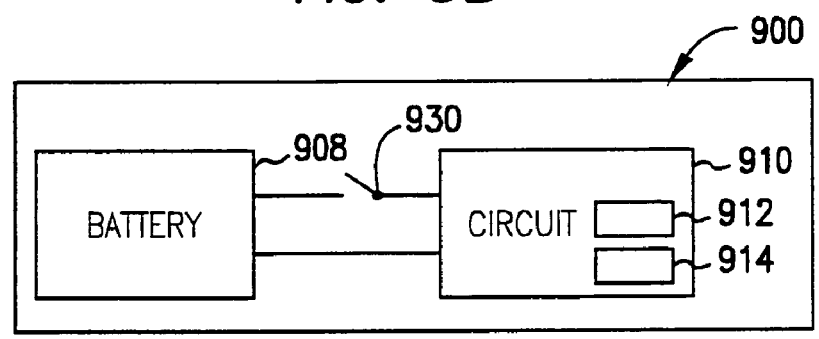
FIG. 9C shows a schematic drawing of a system including a battery, a circuit and an activity-activated switch, wherein the activity-activated switch is in the open position and wherein the circuit includes a memory portion and a timing portion.

FIG. 9C shows a system 900 or a platform that includes a battery 908, a circuit 910, and an activity-activated switch 930. In FIG. 9C, the circuit or electronics 910 include additional devices such as solid-state memory 912 and/or a timing circuit 914. As shown in FIG. 9C, the platform 900 including the battery 908, circuit or electronics 910, and the activity-activated circuit 930 is in a deactivated state.

Figure 9D:
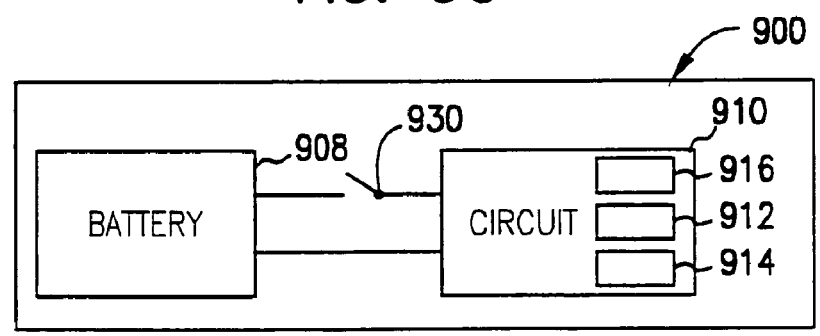
FIG. 9D shows a schematic drawing of a system including a battery, a circuit and an activity-activated switch, wherein the activity-activated switch is in the open position and wherein the circuit includes a memory portion, a timing portion and a processor portion.

The platform 900 shown in FIGS. 9C and 9D is in a deactivated state or with the switch or activity-activated switch 930 shown as open for merely illustrative purposes. It should be noted that the platform could also be shown in the activated state with the activity-activated switch 930 closed. The memory 912 as shown is typically a static memory. Static memory stores information whether the circuit 910 is powered or unpowered. In other words, using static memory 912 and the timing circuit 914, it is possible to record the times of certain events within the memory 912 during the time frame in which the battery 908 is capable of powering the circuit 910. For example, in some instances shock events or the time at which the activity-activated circuit 930 was closed or placed into an active state could be recorded within the memory 912. The timing circuit 914 which would include a timer could be used to record the date and time or merely the time at which a particular activity that activated the switch 930 occurred.

FIG. 9D shows yet another system 900 or platform which includes the battery 908, the circuit 910, and the activity-activated switch 930 in an open or deactivated position. The circuit 910 includes a memory 912, a timer 914, and a microprocessor 916. In the particular embodiment shown in FIG. 9D, the activity-activated switch 930 could be activated and the timer 914 could record the date and time of activation within the static memory 912. Once activated, the microprocessor 916 could carry out specific functions. In some instances, the microprocessor 916 could have very specific and limited tasks and may be termed a microcontroller since it would have dedicated and specific tasks to perform. It should be noted that the solid-state battery 908 shown in FIGS. 9A, 9B, 9C, and 9D could merely be a one-time use battery or could be formed to be recharged over time. The battery 908 could be recharged using a photovoltaic cell and exposing the platform to light, or could be recharged using periodic bursts of radio frequencies, or by any other similar means. The use of rechargeable batteries is discussed in an application entitled "BATTERY-OPERATED WIRELESS-COMMUNICATION APPARATUS AND METHOD" filed Mar. 23, 2001, and having an application Ser. No. 09/815,884, which is co-owned by the applicant of this application and which is incorporated herein by reference.

Figure 10:
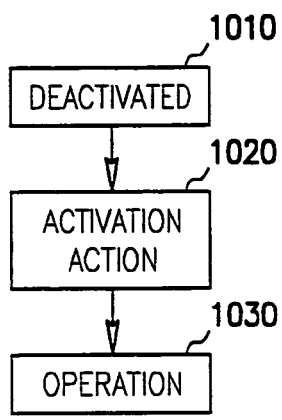
FIG. 10 is a flowchart showing the method of operation of the systems shown in FIGS. 9A-9D.

FIG. 10 shows a flow chart of the method of operation for the circuits shown in FIGS. 9A-9D. As shown in FIG. 10, the platform or system 900 that includes the battery 908, the circuit 910, and the activity-activated switch 930 is initially in a deactivated state, as depicted by reference numeral 1010. It should be noted that generally the deactivated state is when the switch 930 is in an open position. However, there may be instances where the deactivated state is when the activity-activated switch is in a closed position. Furthermore, it may be that there are a number of switching mechanisms and one particular switch may be deactivated while another switch is activated. From the deactivated state 1010 an activation action 1020 takes place. The activation action generally closes the activity-activated switch 930 and places the battery and electrical communication with the circuit or electronics 910. In other words, the activity-activated switch closes and the battery 908 now powers the circuit 910. After the activation action 1020, the circuit 910 or electronics 910 operate or are placed in operation 1030. The operation 1030 can include storing events in memory 912 at particular times according to a timing circuit 914 (shown in FIGS. 9A-9D). Furthermore, the operation can include specific tasks to be performed by the microprocessor or microcontroller 916 (shown in FIG. 9D).

Figure 11:
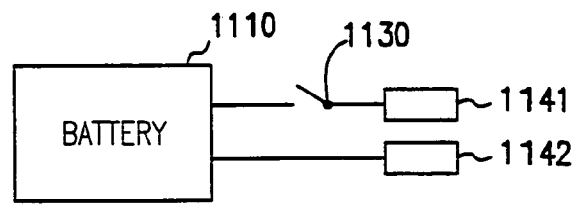
FIG. 11 shows a schematic drawing of the system having a battery and an activity-activated switch.

FIG. 11 shows an alternative embodiment of the invention. A battery 1110 and an activity-activated switch 1130 are included in this particular embodiment. In other words, the battery 1110 is a thin-filmed battery such as shown and formed in FIGS. 1-8, and the activity-activated switch 1130 is attached to (or integrated within) the battery 1110. The activity-activated switch 1130 can be formed as part of the thin-film battery or more accurately stated, can be formed along with the battery 1110 on a substrate 55. A circuit, or other electronics, is not on the substrate 55, but is later connected to a contact 1141 and 1142. In other words, electronics or circuitry remote from a thin-film, solid-state battery 1110 and a activity-activated switch 1130, which both reside on a substrate 55, can be connected to any form of electronics which are not resident on the substrate.

Figure 12A:
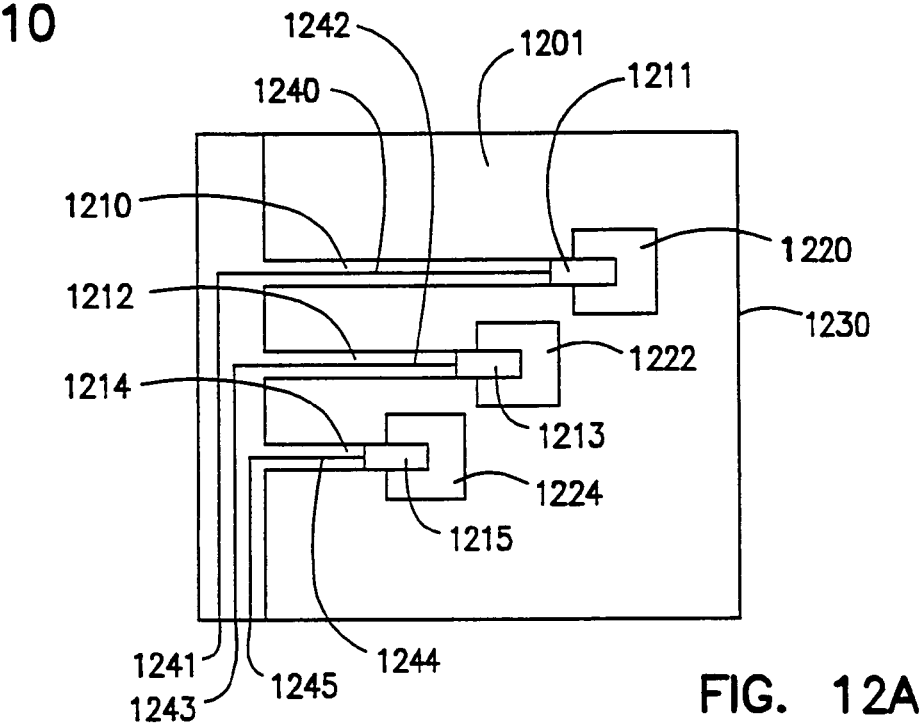
FIG. 12A shows a top view of one embodiment of an activity-activated switch.
Figure 12B:
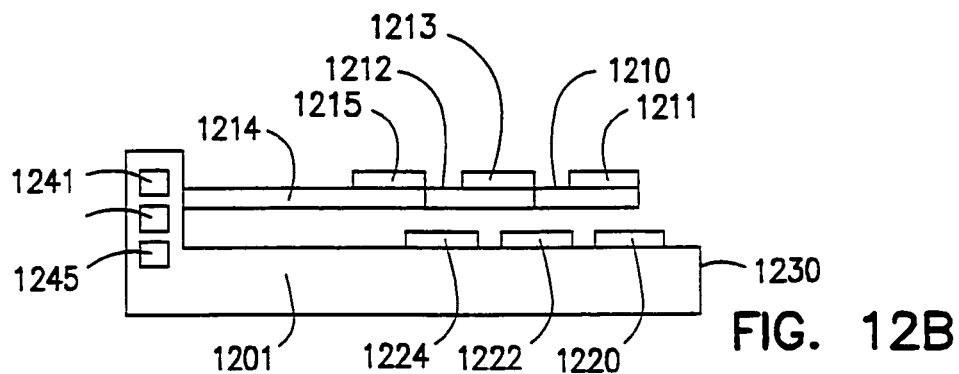
FIG. 12B shows a side view of the embodiment of an activity-activated switch shown in FIG. 12A.

FIGS. 12A and 12B show one type of activity-activated switch that can be used in the devices of FIGS. 9A-9D and other suitable devices. The activity-activated switch shown in FIGS. 12A and 12B is a MEMS device. FIG. 12A shows a top view of MEMS activity-activated switch 1230, while the FIG. 12B shows an elevational view or end view of the MEMS, activity-activated switch 1230. The activity-activated switch 1230 includes a base 1201. Attached to the base 1201 is a first (long) cantilevered beam 1210, a second (intermediate length) cantilevered beam 1212, and a third (short) cantilevered beam 1214. On the end of the first cantilevered beam is a weight or weighted end 1211. Similarly on the end of the second cantilevered beam 1212 is a weighted end 1213 and on the end of the third cantilevered beam 1214 is a cantilevered end 1215. The end of each cantilevered beam also includes electrical contact material. The cantilevered beam is capable of conducting electricity along an electrical path or electrical trace. The first cantilevered beam 1210 has an electrical trace 1240 that ends in a contact or pad area 1241. The second cantilevered beam 1212 includes an electrical trace 1242 that ends in electrical pad or end 1243, while the third cantilevered beam 1214 includes an electrical trace 1244 ending in a pad or end 1245. The cantilevered beams 1210, 1212, and 1214 each have a different length. As a result, the amount of force necessary for the respective beam to bend will differ. In other words, the long cantilevered beam with a weighted end will bend and touch an electrical pad 1220 under a smaller shock load than the shock necessary to bend the cantilevered beam 1212 and place it into contact with electrical pad 1222. The third cantilevered beam 1214 is shorter than either of the cantilevered beams 1210, or 1212. As a result, a shock load or force will have to be even larger still to result in a bending of the cantilevered beam 1214 so that it is placed into electrical contact with contact 1224. The activity-activated switch 1230 (shown in FIGS. 12A and 12B) is basically a three-level switch that activates at varying levels of shock. In other embodiment of this particular activity-activated switch 1230, each of the cantilevered beams could be made the same length and the weight at the end of the cantilevered beam could be varied so that the larger weight would be more responsive to lower shock loads while the lighter weight beam would be responsive to only a larger shock load. As further contemplated, there may be either one cantilevered beam or many cantilevered beams. In other words, the invention of this activity-activated switch is not necessarily limited to a three-cantilever beam configuration.

Figure 13:
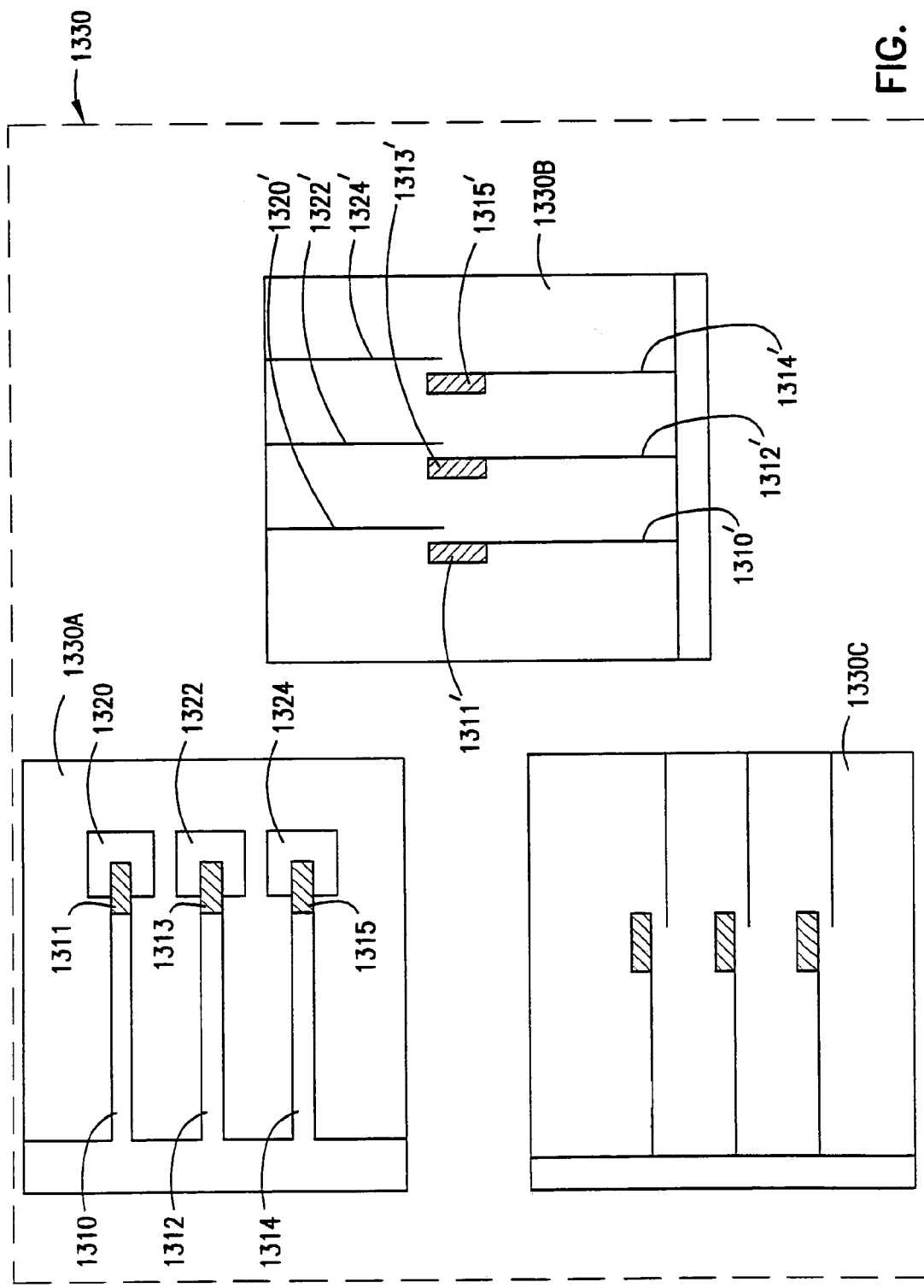
FIG. 13 shows another embodiment of an activity-activated switch that includes portions for detecting acceleration in X, Y and Z-axes.

FIG. 13 shows another embodiment of the activity-activated switch 1330. The activity-activated switch 1330 actually includes a separate switch for X-axis, Y-axis, and Z-axis activation. The Z-axis switch 1330A is a MEMS device, which includes three cantilevered beams having substantially equal lengths and a weighted end 1311, 1313, and 1315, respectively. The weights on each of the ends 1311, 1313, and 1315 are substantially the same. However, the body or the width of each of the cantilevered beams 1310, 1312, and 1314 is changed so that the width of the first cantilevered beam 1310 is slight and the width of the last cantilevered beam 1314 is more substantial with the width of the cantilevered beam 1312 being intermediate with the width of the beam 1310 and the width of the beam 1314. In this way, the same sized weight will affect each of the arms or cantilevered beam 1310, 1312, and 1314 at different shock loads. The ends of the cantilever beam make electrical contact with pads 1320, 1322, and 1324. Each of the beams has electrical traces so that when each of the switches is enabled underneath a shock load the time of the event can be stored within a static memory. As mentioned before, 1330A shows the activity-activated switch for the Z-axis. The system or platform or activity-activated switch 1330 also includes switches for the X direction, 1330B, and a switch for the Y direction, 1330C. Each of these switches is similar and, therefore, only one of the switches 1330B will be described for the sake of simplicity. Again, the activity-activated switch 1330B includes a set of cantilevered arms 1310', 1312', and 1314'. On the end of the cantilevered beam 1310 is a weight 1311', and on the end of the cantilevered beam 1312' is a weight 1313', and on the end of the beam 1314' is a weight 1315'. A set of contacts is attached to the base of the activity-activated switch 1330B. A switch 1320' is positioned to contact the end 1311' of the first cantilevered beam 1310'. Similarly, a contact 1322' is positioned to receive or contact the end 1313' of the second cantilevered beam 1312'. In addition, contact 1324' is positioned to receive the end 1315' of the cantilevered beam 1314'. The activity-activated switch 1330B is designed to have each one of the switches activate upon a different or closed upon at a different level of shock loading. Therefore, the cantilevered arms 1310', 1312', and 1314' can either be made more substantial or the weights at the ends can be changed or the lengths can be changed to make the various portions of the switch actuatable at different shock loads. The activity-activated switch 1330B is a slightly different variation of the MEMS device shown in FIG. 1330A. The switch 1330B is also a MEMS device. A similar switch 1330C is positioned to detect shock loads in the Y direction. It should be noted that with a shock load activity-activated switch in each of the X-, Y-, and Z-axis prevents a shock from happening in one of the axis, which is undetected. It should be noted that various components of a shock load would be felt in the X, Y, and Z-axis.

Figure 20:
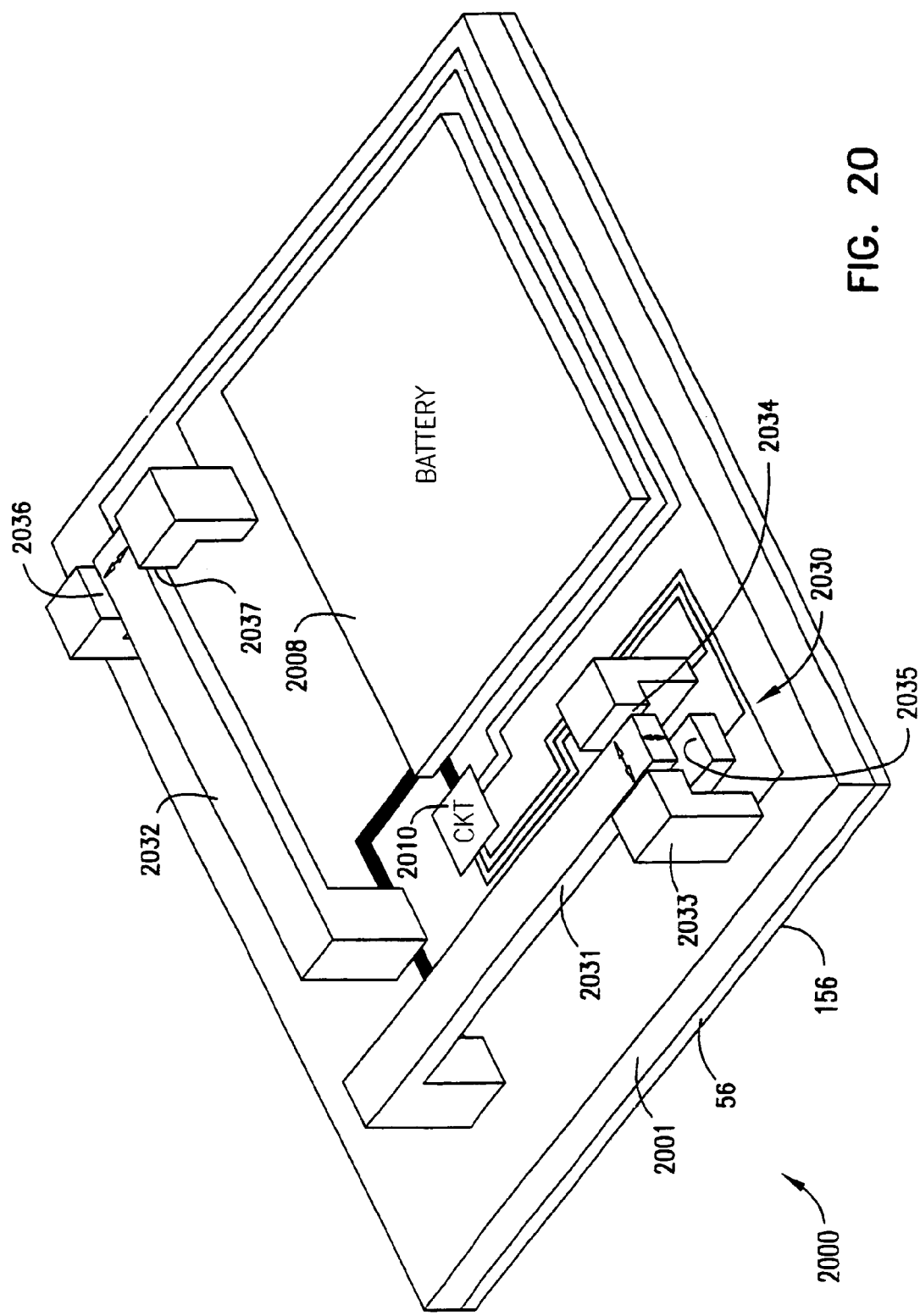
FIG. 20 shows another embodiment of an activity-activated switch.

FIG. 20 shows another embodiment of a system 2000 that includes a battery 2008, a circuit 2010, and an activity-activated switch 2030. The battery 2008, the circuit 2010, and the activity-activated switch 2030 are located on a substrate 2001. The substrate includes an adhesive material 56. Backing 156 covers the adhesive material 56. The backing 156, in one embodiment, is a removable peel-away paper or plastic film that can be removed to expose the adhesive 56. The activity-activated switch 2030 includes a first cantilevered bar 2031 and a second cantilevered bar 2032. The first cantilevered bar 2031 is positioned between a first contact 2033, a second contact 2034, and a third contact 2035. The contacts 2033 and 2034 are L-shaped and include a portion positioned in a plane parallel to the substrate that also substantially includes a portion of the cantilevered arm 2031. Therefore, accelerations in the plane of the substrate in either an X or a Y direction that are at a selected level cause the cantilevered arm 2031 to contact either electrical contact 2033 or electrical contact 2034. The electrical contact 2035 is positioned below the cantilevered arm or in a plane parallel to the end of the cantilevered arm 2031. Accelerations in a Z direction cause the arm 2031 to contact or connect to the contact 2035. Accelerations that cause the beam to deflect away from the contact 2035 still electrically connect to the contact 2035 when the beam travels in the other direction after the initial acceleration. In other words, the beam 2031 slaps the contact 2035 to make the electrical connection.

A cantilevered beam 2032 is positioned between a contact 2036 and another contact 2037. The contacts 2036 and 2037 are L-shaped and include a portion located in a plane substantially parallel to the plane of the substrate 2001. The end of the cantilevered beam 2032 is also in the same plane. In some embodiments, the cantilevered arms 2031 and 2032 are formed equally so that a selected acceleration level in certain planes will result in electrical contact or connection to the various contacts. In other embodiments, the cantilevered beam 2031 and the cantilevered beam 2032 are formed to have different response characteristics to accelerations so that one of the cantilevered beam contact elements 2031, 2032 might be more sensitive in terms of response to accelerations than the other of the cantilevered-beam contact elements. When one of the cantilevered-beam contact elements 2031, 2032 contacts or makes electrical connection to contacts associated with that beam element, the battery activates the circuit 2010. The circuit 2010 carries out a specific function or functions.

In operation, such a switch or switches may be used to detect shock loads and record their times. For example, such a set of switches or an activity-activated switch 1330, 1230, 2030 might be useful in shipping situations. A shipper may include an activity-activated switch that has a very low threshold of shock load to initially activate one of the more responsive portions of the activity-activated switch. In other words, the shipper may have a switch that activates upon taking the package from the shelf that would be a very low shock load. This activity could then be noted by a timer or timing circuit 914, and then placed in memory 912. If the package was dropped or if the package was severely shock loaded during shipment time or at another time after shipment time, another of the cantilevered beams would come in contact with its respective contact point. In other words, a large shock event would be noted by one of the shorter or less responsive beams. Stated another way, in the event of a large shock load, at least two of the beams would make contact with their respective contacts or possibly all three within an activity-activated switch. This time could then also be noted and could be determinative of who pays for a broken product that is shipped. In other words, if the product was shipped during the time frame in which the shipper had possession of the package, then the shipper should pay. If it can be shown that it was delivered, then the consumer should pay for the damaged product or the manufacturer or the shipper should not have to pay for damage to the product.

Another example or use of this particular activity-activated switch for shock loading could be marking the time of the beginning of a warranty period. For example, if one of the shock-loaded switches was very, very sensitive at the time of packaging and shipping a clock could be started which marks the beginning of the warranty or time frame. This would allow for very close proximity or a very close approximation of when the warranty period was started. At a later time when a consumer sought the warranty use, the requirement could be that the package is returned along with the product. The time of the warranty could then be checked. This would prevent consumers from ordering another product and returning it as a new product underneath a warranty period.

Figure 14A:
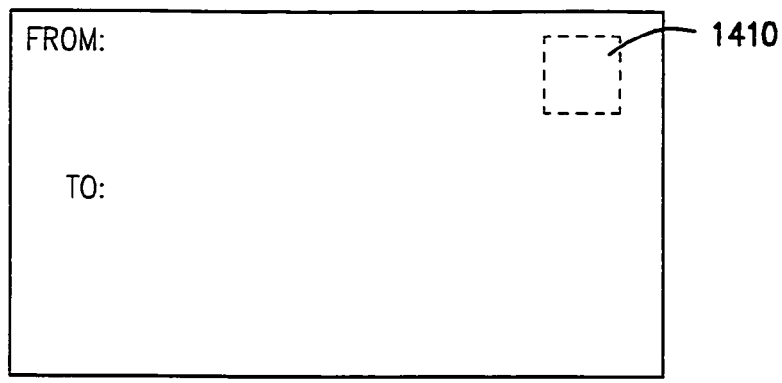
FIG. 14A shows one embodiment of label that includes a system having an activity-activated switch.
Figure 14B:
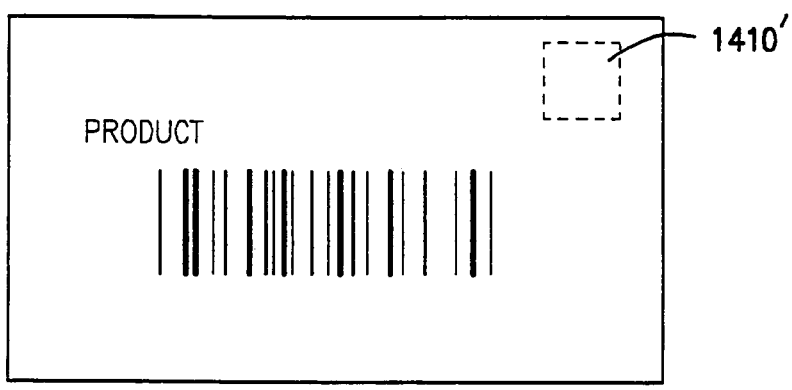
FIG. 14B shows another embodiment of label that includes a system having an activity-activated switch.

In some embodiments, the system, which includes a shock load activated switch 1330 or 1230 or 2030, could be included in a peel off label or a shipping label that could be either attached directly to the product or directly to a package for the product. FIGS. 14A and 14B show two particular labels that use a system including the shock-loaded activity-activated switch, such as 1230, 1330, or 2030 (the switch is not shown in FIG. 14A or 14B). It should also be noted that the shock-loaded activity-activated switches 1230, 1330, and 2030 might also be termed accelerometers. A system which includes a battery, a thin film, a solid-state battery, an accelerometer or shock-load activity-activated switch 1230, 1330, 2030 and circuitry or electronics 910 (shown in FIGS. 9A and 9B) could be formed as part of a label such as the shipping label shown in FIG. 14A or the product label shown in FIG. 14B. Each of the labels includes a platform or system 1410, 1410' that includes a thin film, solid-state battery 908 (shown in FIGS. 9A and 9B), a circuit 910 (shown in FIGS. 9A and 9B), and an activity-activated switch 930 (shown in FIGS. 9A and 9B).

Figure 15:
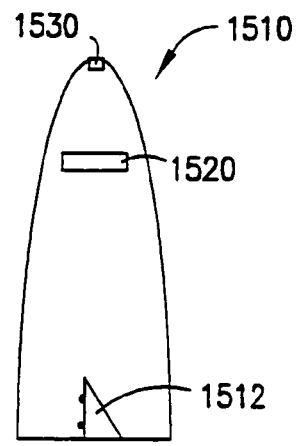
FIG. 15 shows an ordinance that includes a system having an activity-activated switch.

FIG. 15 shows a bullet or other ordinance 1500 that includes a platform or system 1520 which has a battery 908, a circuit 910, and an activity-activated switch 930 (shown in FIGS. 9A and 9B), such as switch 1230 or 1330 or 2030 (not shown in FIG. 15). FIG. 15 includes a bullet or ordinance 1510. Housed within the bullet or ordinance is a system or platform which includes a battery 908, a circuit 910 (shown in FIGS. 9A and 9B), and activity-activated switch or accelerometer 1230 or 1330 or 2030 (not shown in FIG. 15). The circuit 910 could include a microprocessor or microcontroller 916 (shown in FIGS. 9A and 9B). The bullet or ordinance 1510 also includes a fin or fins such as the ones shown carrying the reference numeral 1512. The fin 1512 is controllable. When the ordinance 1510 is shot or accelerated, the activity-activated switch takes the system 1520 from a deactivated state into an activated state. The fin or fins 1512 can then be controlled by a microprocessor or microcontroller within the system 1520 to direct the ordinance toward a target. The circuitry or electronics 910 attached to the battery 908 and the activity-activated switch 930 could include an additional sensor 1530. For example, the sensor 1530 could be an infrared sensor for detecting heat or could be a photovoltaic unit for detecting light or some other sensor for detecting another characteristic of a target. It should be noted that the bullet or ordinance 1510 having a system 1520 can be of any size, including ordinance fired from a rifle or hand gun.

Figure 16A:
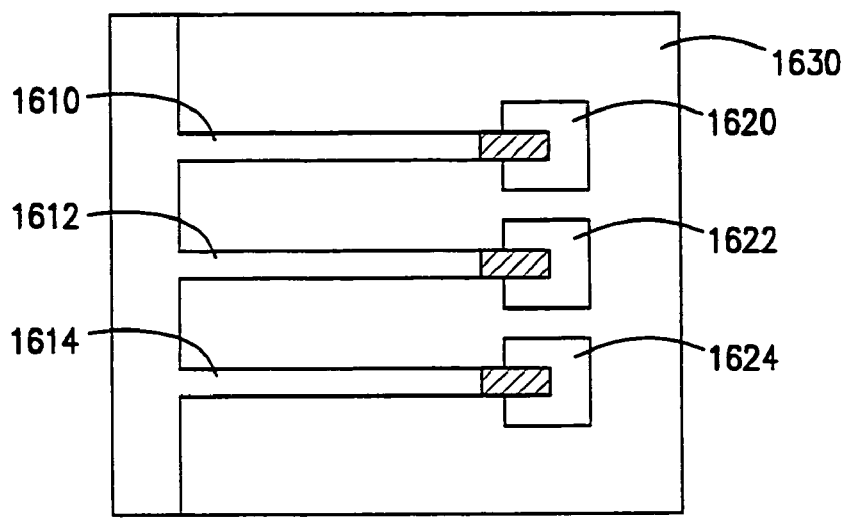
FIG. 16A shows a top view of an embodiment of an activity-activated switch that is activated by a magnetic field.
Figure 16B:
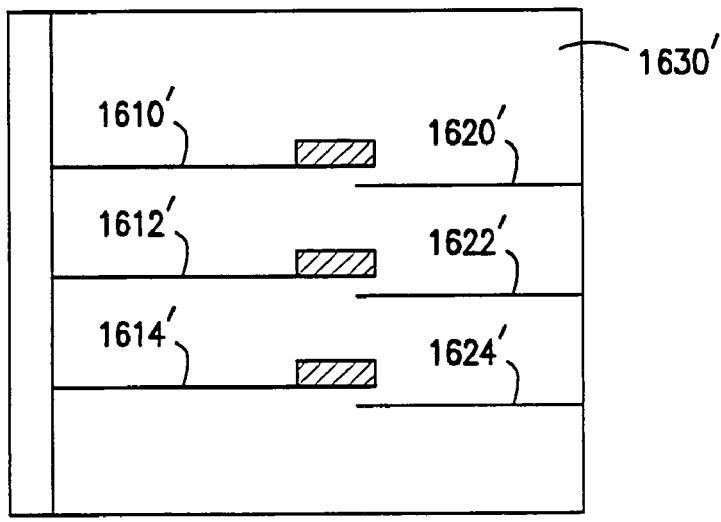
FIG. 16B shows a side view of the embodiment of an activity-activated switch shown in FIG. 16A.

FIG. 16A shows a top view of a magnetically actuated activity-actuated switch 1630. FIG. 16B shows another embodiment of a magnetically actuated switch. Again the switch 1630 or switch 1630' is a MEMS device having a series of cantilevered beams 1610, 1612, 1614. The MEMS devices have a paramagnetic end that is responsive to a magnetic field. The beam 1610, 1612, 1614 have different cross-sectional widths so that they will respond differently to a magnetic field of a specific strength. The magnetic switch shown in FIG. 16B includes a cantilever beam 1610', 1612', and 1614'. These cantilevered beams or arms are also responsive to differing magnetic fields. The arms 1610, 1612, 1614 make contact with electrical contacts 1620, 1622, and 1624. Once one of the arms 1610, 1612, 1614, 1610', 1612', or 1614' contacts an electrical contact 1620, 1622, 1624, 1620', 1622', or 1624' in an electrical field, a battery under it is connected to a circuit 910 as shown in FIG. 9B. This particular activity-activated switch 1630, 1630' is useful for starting a warranty period or for recording the beginning of a warranty period. For example, when a consumer buys an item at a retail establishment, frequently a magnetic device is used to remove an anti-theft mechanism. A magnetic device produces a magnetic field that deactivates the anti-theft device. The same magnetic field could be used to activate one or several of the arms 1610, 1612, 1614, 1610', 1612', or 1614' shown in FIG. 16A or 16B. Thus, the same magnetic field used to deactivate the anti-theft device can be used to activate or begin a warranty time. Another potential use is that the item or device within a package, that has just been purchased and has had the anti-theft device magnetically deactivated, is that the magnetic sensor 1630, 1630' trigger a self-test of the product or item just purchased. The time of the self-test and the results could be recorded within static RAM or static memory 912 (shown in FIG. 9) for retrieval at a later date. Thus, at the point of purchase it could be noted that the device passed the self-test and this could be used for subsequent warranty work.

Figure 17:
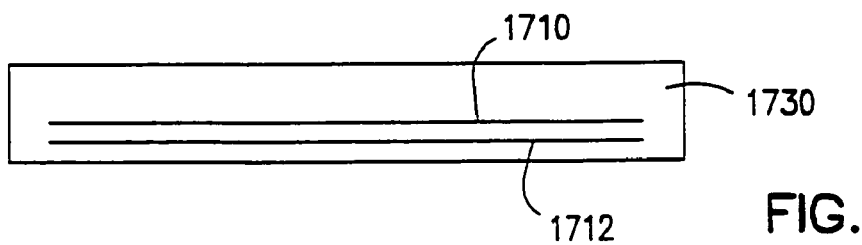
FIG. 17 shows an embodiment of a pressure-sensitive activity-activated switch.

FIG. 17 is another embodiment of an activity-activated switch 930. FIG. 17 shows a schematic representation of a pressure-sensitive switch 1730. The pressure-sensitive switch 1730 includes a first elongated electrical contact 1710 and a second elongated electrical contact 1712. The first electrical contact 1710 is separated from the second electrical contact 1712. Pressure-sensitive switch 1730 can be placed in a label such as the label shown in FIG. 14A or 14B. The label could be provided with a peel-off back and the mere act of peeling off the backing that requires a flexing or curving of the main label could be the activity that places the first contact 1710 in connection with the second contact 1712 of the pressure-sensitive switch 1730. Again, the activity-activated switch that is pressure sensitive could be used in a shipping application or for warranty work. Examples of these applications have been discussed above with respect to the activity-activated switches 1230 and 1330.

Figure 18:
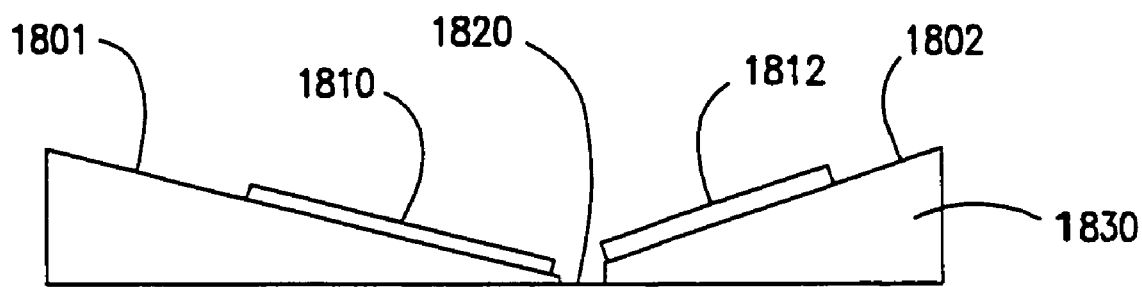
FIG. 18 shows an embodiment of a moisture-sensitive activity-activated switch.

FIG. 18 shows a schematic of a moisture-activated activity switch 1830. The moisture-activated switch 1830 includes a first incline surface 1801 and a second incline surface 1802. A first electrical contact 1810 is attached or associated with the first incline surface 1801, and a second electrical contact 1812 is attached or associated with the second incline surface 1802. When moisture is encountered or occurs, the incline surfaces move the moisture to the lowest possible point, provided that the moisture-activated switch 1830 is positioned so that gravity acts to move the moisture on the incline surfaces 1801, 1802 to the lowest possible point. As the moisture moves to the lowest possible point, the moisture collects in a reservoir 1820. The reservoir 1820 fills with moisture until the moisture in the reservoir 1820 bridges the gap between the first electrical contact 1810 and the second electrical contact 1812. Thus, the switch could be activated upon rain being received in a region, or it could be activated upon submersion of a device within a moist or wet environment. Still further, dew collected on the incline surfaces 1801 and 1802 could provide the moisture to fill the reservoir 1820 to a level where the first electrical contact 1810 is placed in electrical communication with the second electrical contact 1812. Such a switch could be used to place a battery 908 in communication with a circuit or electronics 910 (see FIGS. 9A and 9B) at a time when sufficient moisture closes or provides electrical contact through the switch 1830.

Other applications of activity-activated switches are also contemplated. In one embodiment, a heat-activated activity switch 930 is used. The structure would be similar to the structure needed for a sprinkler system within a building. In this particular embodiment, the heat-activated switch would place a battery 908 into communication with a circuit 910 or electronics 910. An example application would be used in a sprinkler system whereby the sprinkler, after being enabled, would be disabled when smoke was no longer detected or the temperature within a room went below a certain threshold level.

One more example of use of an activity-activated switch 930 would be to use the acceleration-activated type switches 1230, 1330 in the ejection seat in planes for test pilots. Many times test pilots are flying airplanes at very high elevation and if an ejection is necessary at one of these high elevations, it is necessary for the parachute not to open until the pilot within the seat is at an elevation where they have sufficient oxygen to survive. In other words, if flying at a high elevation and the ejection seat is necessary to be deployed, it is advantageous, and even life saving, for the pilot to drop through the higher elevation to an elevation where there is sufficient oxygen for the pilot to survive. Such an elevation may be anywhere from 10-15,000 feet or maybe at any other selected range. Therefore, the activity-activated switch 1230, 1330 would power electronics or circuit 910 that would include an altimeter. The electronic would use the altimeter reading for determining when to deploy a parachute attached to the ejection seat. This would provide for the best chance of survival for a pilot that would have to eject at high elevations.

Figure 19:
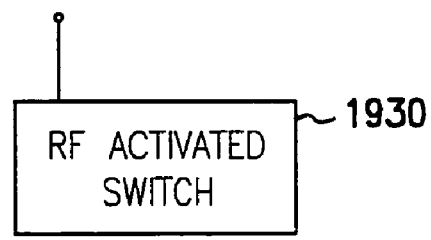
FIG. 19 shows an embodiment of a RF-activated switch.

FIG. 19 shows an RF activated switch. It is contemplated that other applications would be available after an RF signal activates an activity-activated switch 930, 1930.

CONCLUSION

One aspect of the present invention provides a thin-film battery and an activity-activated switch. A system includes a substrate, a circuit connected to the substrate, and a thin-film battery connected to the substrate and connected to the circuit. The thin-film battery powers the circuit. An acceleration-enabled switch is also connected to the substrate for electrically activating the circuit. In one embodiment, the acceleration-enabled switch is a MEMS device. In one embodiment, the acceleration-enabled switch includes at least one cantilevered beam. In another embodiment, the acceleration-enabled switch includes at least one cantilevered beam and an electrical contact. The at least one cantilevered beam contacts the electrical contact in response to an acceleration. In another embodiment, the acceleration-enabled switch includes a first cantilevered-beam-closure-switch, and a second cantilevered-beam-closure-switch. The first cantilevered-beam-closure-switch forms electrical contact in response to a first acceleration, and the second cantilevered-beam-closure-switch forms electrical contact in response to a second acceleration. The first acceleration is different than the second acceleration. In another embodiment, the acceleration-enabled switch forms a first electrical contact in response to a first acceleration, and forms a second electrical contact in response to a second acceleration. The first acceleration is different than the second acceleration. In still another embodiment, the first acceleration-enabled switch activates the circuit differently in response to acceleration in either of two different planes. A first cantilevered-beam-closure-switch forms electrical contact in response to a first acceleration in a first plane, and a second cantilevered-beam-closure-switch forms electrical contact in response to a first acceleration in response to a second acceleration in a second plane.

The circuit further includes a memory, and a timer. The timer records the time when one of the first cantilevered-beam-closure-switch forms electrical contact in response to a first acceleration, or the time when the second cantilevered-beam-closure-switch forms electrical contact in response to a second acceleration is stored in memory. In some embodiments, the time when the other of the first cantilevered-beam-closure-switch forms electrical contact in response to a first acceleration, or the time when the second cantilevered-beam-closure-switch forms electrical contact in response to a second acceleration is stored in memory.

In one embodiment, the battery is sputtered onto the substrate, and the circuit is formed on the battery. In another embodiment, the circuit is sputtered onto the substrate, and the battery is sputtered onto the circuit. In still another embodiment, the system fits within a device such as a package, or an ordinance. In yet another embodiment, an adhesive attached to the substrate wherein the system is adhesively attached to the device. The adhesive attached to the substrate.

A system includes a substrate, and a thin-film battery positioned on the substrate. The thin-film battery further includes a first lead, a first electrical contact in electrical communication with the first lead, a second lead, and a second electrical contact in electrical communication with the second lead. The system also includes an activity-activated switch connected to one of the first and second leads on the substrate for electrically connecting the thin-film battery to the first electrical contact and the second electrical contact. An adhesive is attached to the substrate. The activity-activated switch is activated in response to acceleration. In one embodiment, the activity-activated switch is activated in response to a magnetic field. In another embodiment, the activity-activated switch is activated in response to moisture. In still another embodiment, the activity-activated switch is activated in response to a radio signal. In yet another embodiment, the activity-activated switch is activated in response to pressure. In still another embodiment, the activity-activated switch is activated in response to light. The system also includes electronics attached to the first lead and the second lead. The electronics are also associated with the substrate. In some embodiments, the electronics are attached to the substrate and the thin-film battery is attached to the electronics. In another embodiment, the thin-film battery is attached to the substrate and at least a portion of the electronics is attached to the thin-film battery. The activity-activated switch is formed using microelectronic fabrication techniques.

A method includes activating an activity-activated switch to place a thin-film battery in communication with a set of electronics, and directing an ordnance using the powered electronics. Another method includes activating an activity-activated switch to place a thin-film battery in communication with a set of electronics and storing a start time for a warranty using the powered electronics. In one embodiment, the activity-activated switch includes accelerating the activity-activated switch at a selected level. In another embodiment, the method also includes running a self-check, and storing the result of the self-check in response to activating the activity-activated switch. In other embodiments, other accelerations are stored. The time associated with other accelerations over a selected threshold is also recorded. The times of the other accelerations to the time are compared to other periods, such as when a shipper was in possession of the activity-activated switch.

Advantageously, the systems that include one or more batteries, devices to enable or activate the battery or batteries, and a circuit can be formed on a film and placed into small packages or products. In addition, the batteries, activation device and a circuit can be formed on a flexible sheet having an adhesive thereon so that the package is essentially a label that can be placed on the outside of a package or with the product packaging or on the product or device. A complete system can also be incorporated into a product or device to control an aspect of the device or record information about the product or device. The enabling or activating apparatus enable a switch in response to an event or events at a later time. The systems do not have to be manually activated. Rather, the systems are automatically activated in response to an event.

The entire system is inexpensive. As a result, these systems can affordably be used on a widespread basis. As a result, manufacturers, wholesalers and event retailers could provide such a system either attached to a device or as part of the packaging associated with many devices or products. In addition, these systems are light and provide sufficient energy storage to accomplish at least one function. The system is fabricated from non-toxic materials so that a hazard is not being used with a product or device.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What we claim is:

1. A system comprising:
   a substrate;
   a circuit connected to the substrate;
   a thin-film battery formed on the substrate and connected to the circuit, the thin-film battery operable to power the circuit; and
   an acceleration-enabled switch connected to the substrate and operably coupled to electrically activate the circuit, wherein the acceleration-enabled switch is a cantilevered-beam MEMS device.

2. A system comprising:
   a substrate;
   a circuit connected to the substrate;
   a thin-film battery formed on the substrate and connected to the circuit, the thin-film battery operable to power the circuit; and
   an acceleration-enabled switch connected to the substrate and operably coupled to electrically activate the circuit, wherein the battery is sputtered onto the substrate and the circuit is formed on the battery.

3. A system comprising:
   a substrate;
   a circuit connected to the substrate;
   a thin-film battery formed on the substrate and connected to the circuit, the thin-film battery operable to power the circuit; and
   an acceleration-enabled switch connected to the substrate and operably coupled to electrically activate the circuit, wherein the acceleration-enabled switch is a MEMS device, and wherein the acceleration-enabled switch includes at least one cantilevered beam and an electrical contact, the at least one cantilevered beam contacting the electrical contact in response to an acceleration.

4. The system of claim 3, wherein the acceleration-enabled switch forms a first electrical contact in response to a first acceleration and forms a second electrical contact in response to a second acceleration, the first acceleration different than the second acceleration.

5. The system of claim 3, wherein the acceleration-enabled switch includes:
   a first cantilevered-beam-closure-switch; and
   a second cantilevered-beam-closure-switch.

6. The system of claim 5, wherein the first cantilevered-beam-closure-switch forms electrical contact in response to a first acceleration and the second cantilevered-beam-closure-switch forms electrical contact in response to a second acceleration, the first acceleration different than the second acceleration.

7. The system of claim 3, wherein the acceleration-enabled switch includes a cantilevered beam and an electrical contact in each of at least two different directions such that the circuit activates differently in response to acceleration in either of two different planes.

8. The system of claim 7, wherein the acceleration-enabled switch includes a first cantilevered-beam-closure-switch that forms electrical contact in response to a first acceleration in a first plane, and a second cantilevered-beam-closure-switch that forms electrical contact in response to a first acceleration in response to a second acceleration in a second plane.

9. The system of claim 3, further comprising peel-and-stick adhesive attached to the substrate and covered by a peelable layer, wherein the system forms a label configured to be adhesively attached to a package.

10. The system of claim 3, wherein the system fits within a device.

11. The system of claim 10, wherein the device is an ordinance.

12. The system of claim 11, wherein the ordinance includes a guidance system that is powered from the battery.

13. A system comprising:
    a substrate;
    a circuit connected to the substrate;
    a thin-film battery formed on the substrate and connected to the circuit, the thin-film battery operable to power the circuit; and
    an acceleration-enabled switch connected to the substrate and operably coupled to electrically activate the circuit, wherein the acceleration-enabled switch is a MEMS device, wherein the acceleration-enabled switch includes at least one cantilevered beam and an electrical contact, the at least one cantilevered beam contacting the electrical contact in response to an acceleration, and wherein the circuit is formed on the substrate and the battery is sputtered onto the circuit.

14. A system for powering electronics, the system comprising:
    a substrate;
    a thin-film battery formed on the substrate;
    a first lead connected to the thin-film battery;
    a first electrical contact in electrical communication with the first lead;
    a second lead connected to the electronics;
    a second electrical contact in electrical communication with the second lead; and
    an activity-activated MEMS switch formed on the substrate or the electronics and configured to electrically connect the first electrical contact to the second electrical contact.

15. A system for powering electronics, the system comprising:
- a substrate;
- a thin-film battery formed on the substrate;
- a first lead connected to the thin-film battery;
- a first electrical contact in electrical communication with the first lead;
- a second lead connected to the electronics;
- a second electrical contact in electrical communication with the second lead; and an activity-activated MEMS switch that is formed on at least one of the substrate, the battery, and the electronics, and that is configured to electrically connect the first electrical contact to the second electrical contact, wherein the activity-activated switch is formed in place using microelectronic fabrication techniques.

16. The system of claim 15, wherein the activity-activated switch is configured to be activated in response to acceleration.

17. The system of claim 15, wherein the activity-activated switch is configured to be activated in response to a magnetic field.

18. The system of claim 15, wherein the activity-activated switch is configured to be activated in response to moisture.

19. The system of claim 15, wherein the activity-activated switch is configured to be activated in response to a radio signal.

20. The system of claim 15, wherein the activity-activated switch is configured to be activated in response to pressure.

21. The system of claim 15, wherein the activity-activated switch is configured to be activated in response to light.

22. A method comprising:
- activating an activity-activated switch to place a thin-film battery in communication with a set of electronics in an ordinance;
- directing the ordinance using the powered electronics.

23. The method of claim 22, further comprising taking the ordinance from a deactivated state into an activated state due to the ordinance being shot causing the activating of the activity-activated switch.

24. The method of claim 22, further comprising guiding the ordinance using one or more controllable fins controlled by the electronics, which are activated after the ordinance is shot.

* * * * *